(12) United States Patent
Nakamura et al.

(10) Patent No.: US 8,312,489 B2
(45) Date of Patent: Nov. 13, 2012

(54) CM SEARCHING METHOD AND APPARATUS, AND CM-APPENDANT INFORMATION SUPPLYING METHOD AND APPARATUS

(75) Inventors: Osamu Nakamura, Saitama (JP); Mototsugu Abe, Kanagawa (JP)

(73) Assignee: Sony Corporation (JP)

( * ) Notice: Subject to any disclaimer, the term of this patent is extended or adjusted under 35 U.S.C. 154(b) by 435 days.

(21) Appl. No.: 11/351,667

(22) Filed: Feb. 10, 2006

(65) Prior Publication Data

US 2006/0188228 A1    Aug. 24, 2006

(30) Foreign Application Priority Data

Feb. 23, 2005    (JP) .................................. 2005-047799
Feb. 23, 2005    (JP) .................................. 2005-047800

(51) Int. Cl.
*G06F 3/00*    (2006.01)
*G06F 13/00*    (2006.01)
*H04N 5/445*    (2006.01)
*H04N 7/173*    (2006.01)

(52) U.S. Cl. ................ 725/53; 725/38; 725/42; 725/43; 725/46; 725/118; 725/114; 725/131

(58) Field of Classification Search .................... 725/38, 725/42, 43, 46, 53, 118, 131, 148, 151; 707/999.003
See application file for complete search history.

(56) References Cited

U.S. PATENT DOCUMENTS 6,434,552 B1 *   8/2002 Leong ............................... 707/4
(Continued)

FOREIGN PATENT DOCUMENTS

JP    09046651 A    2/1997
(Continued)

OTHER PUBLICATIONS

Office Action from Japanese Application No. 2005-047799, dated May 25, 2010.
(Continued)

*Primary Examiner* — Pinkal R Chokshi
(74) *Attorney, Agent, or Firm* — Lerner, David, Littenberg, Krumholz & Mentlik, LLP

(57) ABSTRACT

Inquiry about information on a CM can be made based on a feature of that CM, and a server can be inquired about a CM which meets a condition such as keyword, thereby permitting the user to view his desired CM. Detecting a commercial message from a television broadcast, calculating a feature of the detected commercial message and accepting input information appendant to the commercial message, a CM information server creates a data base in which the calculated commercial-message feature and commercial message-appendant information are associated with each other. In response to a request for a commercial message search in which a keyword sent from the user via a network is taken as a key, the CM information server searches the data base for a commercial-message feature and sends the commercial-message feature detected in the data base to the user via the network. The user calculates a feature of the commercial message detected in the television broadcast to select a commercial message whose feature is coincident with the commercial-message feature sent from the CM information server. Also, in response to a request for commercial message-appendant information sent from the user via the network, the CM information server searches the data base on the basis of the commercial-message feature as a key to read commercial message-appendant information whose feature is coincident with the feature detected in the data base and sends it to the user via the network.

2 Claims, 27 Drawing Sheets

U.S. PATENT DOCUMENTS

| | | | |
|---|---|---|---|
| 7,076,443 B1* | 7/2006 | Emens et al. | 705/14.55 |
| 7,134,132 B1* | 11/2006 | Ngo et al. | 725/34 |
| 7,209,942 B1* | 4/2007 | Hori et al. | 709/203 |
| 7,212,730 B2* | 5/2007 | Boston et al. | 386/83 |
| 7,251,413 B2* | 7/2007 | Dow et al. | 386/248 |
| 7,334,251 B2* | 2/2008 | Rodriguez et al. | 725/42 |
| 7,571,155 B2* | 8/2009 | Choi et al. | 1/1 |
| 7,735,104 B2* | 6/2010 | Dow et al. | 725/52 |
| 7,849,160 B2* | 12/2010 | Hayward | 709/219 |
| 7,962,007 B2* | 6/2011 | Abe et al. | 386/249 |
| 7,996,874 B2* | 8/2011 | Kamangar | 725/93 |
| 8,165,417 B2* | 4/2012 | Yamashita et al. | 382/274 |
| 2002/0032906 A1* | 3/2002 | Grossman | 725/42 |
| 2003/0115596 A1* | 6/2003 | Okajima et al. | 725/34 |
| 2004/0093620 A1* | 5/2004 | Iino et al. | 725/134 |
| 2004/0268399 A1* | 12/2004 | Asakawa | 725/89 |
| 2007/0079324 A1* | 4/2007 | Hallford et al. | 725/28 |
| 2007/0083887 A1* | 4/2007 | Gutta et al. | 725/35 |
| 2009/0304357 A1* | 12/2009 | Rashkovskiy et al. | 386/95 |

FOREIGN PATENT DOCUMENTS

| | | |
|---|---|---|
| JP | 2000231570 A | 8/2000 |
| JP | 2002-010237 A | 1/2002 |
| JP | 2002-016873 A | 1/2002 |
| JP | 2002027344 A | 1/2002 |
| JP | 2002259796 A | 9/2002 |
| JP | 2003196658 A | 7/2003 |
| JP | 2003-339010 A | 11/2003 |
| JP | 2003323452 A | 11/2003 |

OTHER PUBLICATIONS

Office Action from Japanese Application No. 2005-047799, dated Nov. 24, 2010.

* cited by examiner

CM SEARCHING METHOD AND APPARATUS, AND CM-APPENDANT INFORMATION SUPPLYING METHOD AND APPARATUS

CROSS REFERENCE TO RELATED APPLICATIONS

The present invention contains subject matter related to Japanese Patent Application JP 2005-047799 filed in the Japanese Patent Office on Feb. 23, 2005 and Japanese Patent Application JP 2005-047800 filed in the Japanese Patent Office on Feb. 23, 2005, the entire contents of which being incorporated herein by reference.

BACKGROUND OF THE INVENTION

The present invention relates to a method of searching a commercial message via a network, CM search-result receiving method, CM searching apparatus, CM search-result receiving apparatus, and a CM-recording programming system.

In the field of commercial television broadcasting, a commercial message (will be referred to as "CM" hereunder) as an effective means of advertising a commercial article or service to the consumers has been broadcasted in the past concomitantly with the main part of a TV program. Generally, since a CM broadcast is limited in length of time, however, so it cannot be said that the consumers watching the TV is provided with sufficient information on a commercial article or service advertised in the CM broadcast. To complement such insufficiency information, the article is displayed at the shops or a catalogue of the article is distributed to the consumers. Currently, since the Internet has been widely prevalent, many makers or distributors of commercial articles and service providers have their own Internet web sites where they provide information on their article and service. On the other hand, the consumer having seen a broadcast CM for a commercial article and wanting to get further information on the article itself, an actor or actress appearing in the CM, music used with the CM or the like will actually go to the store where that article is sold, get the catalog of the article, access the Internet web site or do otherwise.

Currently, however, a consumer having seen a TV-broadcast CM for a commercial article or service and wanting to get information on the CM has to write down the name of the company having put on the CM and the name of the article and go to the store where the article is sold, access the Internet web site of the company or do otherwise. The currently prevalent Internet service permits the consumer to easily access the Internet web site for making a search for various kinds of information. However, retrying a search for such information after seeing the TV will be rather troublesome to many of such consumers. Perhaps the consumers will not be able to get information such as necessary keyword for searching a CM broadcast for only a limited length of time as above.

To overcome the above-mentioned inconvenience, there was proposed, for example, a method in which a server can sequentially record CMs having ever been broadcasted and the user can acquire information on a desired CM by sending a time when the CM was broadcasted and a broadcast channel on which the CM was broadcasted to the server (see the Japanese Patent Application Laid Open No. 2002-10237, for example; this will be referred to as "Patent Document 1" hereunder).

There was also proposed, for example, a method in which a commercial-message part of a TV broadcast signal is detected or retrieved with a high accuracy by detecting, in an input signal, a candidate interval of a first signal on the basis of a signal-feature pattern taking place at predetermined time intervals, extracting a feature indicative of the likelihood of the first signal from input signals in, before and after the candidate interval, and detecting the interval of the first signal on the basis of the extracted feature (see the Japanese Patent Application Laid Open No. 2002-16873, for example; this will be referred to as "Patent Document 21" hereunder).

Further, there was proposed a method of detecting a user-desired reading position in a recorded video signal and/or audio signal for reproducing the signals, wherein with feature vectors of the video signal and/or audio signal having been recorded at the time of recording the signals and also with a feature vector corresponding to a signal position designated by the user, for example, having been registered when reproducing the recorded video signal and/or audio signal, a feature vector whose value of correlation with at least one of the registered feature vectors exceeds a predetermined threshold is detected in the feature vectors recorded in a recording means, a reading point is set on the basis of the detected feature vector, and the video signal and/or audio signal are reproduced starting at the reading point (see the Japanese Patent Application Laid Open No. 2003-339010, for example; this will be referred to as "Patent Document 3" hereunder).

SUMMARY OF THE INVENTION

However, there exists a problem to solve how the user is enabled to simply acquire a CM which meets a condition as a starting point. Wanting to collect CMs in which an actor appears, for example, the user has to check all the CMs he has ever recorded one after another by himself. Further, when the user wants to view a certain CM the user has not yet viewed, such as one of a series of CMs, he has to watch the TV broadcast on and on until that CM is broadcasted. The broadcast time and channel of a TV program can easily be known based on a TV program broadcast schedule but no broadcast time and channel for any CM are publicized. What is to be reminded in solution of these problems is that a CM is also a literary work. That is, it is not legally allowed to access an image itself in a CM over the Internet or the like without permission of the copyright holder for the CM.

However, since in the conventional method disclosed in the aforementioned Patent Document 1, the inquiry about a CM is based on the time and channel at and on which the CM was broadcasted, so this method is not applicable in case such CM broadcast time and channel are not known. For example, when the user views a recorded TV program being reproduced, the time the user views the program is different from the time the CM was actually broadcasted. Also it is practically difficult to know the records of CM broadcast from all the TV broadcast stations.

It is therefore desirable to overcome the above-mentioned drawbacks of the related art by providing a method in which a server can be inquired about a CM which meets a condition such as keyword and the server send a feature of that CM, to thereby permitting the user to view his desired CM on the basis of the feature.

It is also desirable to provide a method in which recording a CM which meets a condition is programmed based on a feature of that CM.

It is also desirable to provide a method in which inquiry about information on a CM can be made based on a feature of that CM.

According to the present invention, there is provided a CM searching method in which having detected a commercial message in a television broadcast, calculated a feature of the detected commercial message, accepted input of information appendant to the commercial message, and created a data base in which the calculated commercial-message feature and the commercial message-appendant information are associated with each other, a CM searching apparatus searches, in response to a request for a commercial-message search in which a keyword sent from a CM search-result receiving apparatus via a network is taken as a key, the data base for a commercial-message feature on the basis of the keyword as a key, and sends the commercial-message feature detected in the data base to the CM search-result receiving apparatus via the network, and the CM search-result receiving apparatus sends a request for a search in which the keyword for a search for the commercial message is taken as a key to the CM searching apparatus via the network and receives the commercial-message feature detected by the CM searching apparatus from the data base via the network, detects a CM in a television broadcast, calculates a feature of the detected commercial message, and selects a commercial message whose calculated feature is coincident with the commercial-message feature received from the CM searching apparatus via the network.

According to the present invention, there is also provided a CM-recording programming method in which having detected a commercial message in a television broadcast, calculated a feature of the detected commercial message, accepted input of information appendant to the commercial message, and created a data base in which the calculated commercial-message feature and the commercial message-appendant information are associated with each other, a CM searching apparatus searches, in response to a request for a commercial-message search in which a keyword sent from a CM search-result receiving apparatus via a network is taken as a key, the data base for a commercial-message feature on the basis of the keyword as a key, and sends the commercial-message feature detected in the data base to the CM search-result receiving apparatus via the network, and the CM search-result receiving apparatus sends a request for a search in which the keyword for a search for the commercial message is taken as a key to the CM searching apparatus via the network and receives the commercial-message feature detected by the CM searching apparatus in the data base via the network, programs recording of a commercial message whose feature is coincident with the commercial-message feature received from the CM searching apparatus via the network, detects a CM in a television broadcast, calculates a feature of the detected commercial message, and records a commercial message whose calculated feature is coincident with the commercial-message feature received from the CM searching apparatus via the network.

According to the present invention, there is also provided a CM searching apparatus including a television broadcast receiving means, and a controlling means for controlling the operations of detecting a commercial message in a television broadcast received by the television broadcast receiving means, calculating a feature of the detected commercial message, accepting input of information appendant to the commercial message and storing the accepted commercial message-appendant information into a data base in which the calculated commercial-message feature and the commercial message-appendant information are associated with each other, searching, in response to a request for a commercial-message search in which a keyword sent from a CM search-result receiving apparatus via a network is taken as a key, the data base for a commercial-message feature on the basis of the keyword as a key, and sending the commercial-message feature detected in the data base to the CM search-result receiving apparatus via the network.

According to the present invention, there is also provided a CM search-result receiving apparatus including a television broadcast receiving means, and a controlling means for controlling the operations of sending a request for a search in which a keyword for a commercial message to be searched is taken as a key to a CM searching apparatus via a network and receiving a commercial-message feature detected by the CM searching apparatus in the data base via the network, detecting a CM in a television broadcast received by the television broadcast receiving means, calculating a feature of the detected commercial message, and selecting a commercial messages whose calculated feature is coincident with the commercial-message feature received from the CM searching apparatus via the network.

According to the present invention, there is also provided a CM-recording programming system including a CM searching apparatus including a television broadcast receiving means, and a controlling means for controlling the operations of detecting a commercial message in a television broadcast received by the television broadcast receiving means, calculating a feature of the detected commercial message, accepting input of information appendant to the commercial message and storing the accepted commercial message-appendant information into a database in which the calculated commercial-message feature and the commercial message-appendant information are associated with each other, searching, in response to a request for a commercial-message search in which a keyword sent from a CM search-result receiving apparatus via a network is taken as a key, the data base for a commercial-message feature on the basis of the keyword as a key, and sending the commercial-message feature detected in the data base to the CM search-result receiving apparatus via the network, and a CM search-result receiving apparatus including a television broadcast receiving means, and a controlling means for controlling the operations of sending a request for a search in which a keyword for a commercial message to be searched is taken as a key to a CM searching apparatus via a network and receiving a commercial-message feature detected by the CM searching apparatus in the data base via the network, detecting a CM in a television broadcast received by the television broadcast receiving means, calculating a feature of the detected commercial message, and recording a commercial message whose calculated feature is coincident with the commercial-message feature received from the CM searching apparatus via the network.

According to the present invention, there is also provided a CM-appendant information supplying method of supplying information appendant to a commercial message from a CM-appendant information supplying apparatus to a CM-appendant information receiving apparatus via a network, the method being such that having detected a commercial message in a television broadcast, calculated a feature of the detected commercial message, accepted input of information appendant to the commercial message and created a data base in which the calculated commercial-message feature and the commercial message-appendant information are associated with each other, the CM-appendant information supplying apparatus functions to search, in response to a request for sending commercial message-appendant information, sent from the CM-appendant information receiving apparatus via the network, the data base for a commercial message-appendant information feature on the basis of the commercial-message feature as a key and read commercial message-appendant information on the feature detected in the data base, and send the commercial message-appendant information to the CM-appendant information receiving apparatus via the network.

According to the present invention, there is also provided a CM-appendant information supplying apparatus to supply information appendant to a commercial message to a CM-appendant information receiving apparatus via a network, the apparatus including a television broadcast receiving means, and a controlling means for controlling the operations of detecting a commercial message in a television broadcast received by the television broadcast receiving means, calculating a feature of the detected commercial message, accepting input of information appendant to the commercial message, storing the commercial message-appendant information input into a data base in which the calculated commercial-message feature and the commercial message-appendant information are associated with each other, searching, in response to a request for sending commercial message-appendant information, sent from the CM-appendant information receiving apparatus via the network, the data base for a commercial-message-appendant information feature on the basis of the commercial-message feature as a key, reading commercial message-appendant information on the feature detected in the data base, and sending the commercial message-appendant information to the CM-appendant information receiving apparatus via the network.

According to the present invention, there is also provided a CM-appendant information receiving apparatus to receive information appendant to a commercial message via network from a CM-appendant information supplying apparatus having a data base in which a feature of a commercial message and information appendant to the commercial message are associated with each other, the apparatus including a television broadcast receiving means, and a controlling means for controlling the operations of detecting the commercial message received by the television broadcast receiving means, calculating a feature of the detected commercial message, and sending the calculated commercial-message feature as a data-base search key to the CM-appendant information supplying apparatus via the network and receiving a commercial message from the CM-appendant information supplying apparatus via the network.

According to the present invention, there is also provided a CM-appendant information supplying system to supply a CM-appendant information from a CM-appendant information supplying apparatus to a CM-appendant information receiving apparatus via a network, the system including the CM-appendant information supplying apparatus including a television broadcast receiving means, and a controlling means for controlling the operations of detecting a commercial message in a television broadcast received by the television broadcast receiving means, calculating a feature of the detected commercial message, accepting input of information appendant to the commercial message, storing the commercial message-appendant information input into a data base in which the calculated commercial-message feature and the commercial message-appendant information are associated with each other, searching, in response to a request for sending commercial message-appendant information, sent from the CM-appendant information receiving apparatus via the network, the data base for a commercial-message-appendant information feature on the basis of the commercial-message feature as a key, reading commercial message-appendant information on the feature detected in the data base, and sending the commercial message-appendant information to the CM-appendant information receiving apparatus via the network, and the CM-appendant information receiving apparatus including a television broadcast receiving means, and a controlling means for controlling the operations of detecting the commercial message received by the television broadcast receiving means, calculating a feature of the detected commercial message, and sending the calculated commercial-message feature as a data-base search key to the CM-appendant information supplying apparatus via the network and receiving a commercial message from the CM-appendant information supplying apparatus via the network.

According to the present invention, when the user makes a search for the CM conforming to the keyword from the server on the network, the search result is returned as the feature of the detected CM to the user and the user himself makes a search for the CM on the basis of the feature as a key in his recorder/player. Thus, the present invention enables the user to make a search for the CM without returning the CM itself from the server to the user.

Also, the CM-recording programming method according to the present invention, in which the CM conforming to the feature received from the server is to be recorded, permits the user to program recording of a CM whose broadcast time and channel are not known.

According to the present invention, when acquiring the CM-appendant information from the server on the network, the user uses the feature of the CM as information for identification of the CM in place of the video of the CM, whereby it is made possible to considerably reduce the amount of data to be sent from the user to the server and search the data base in the server at a considerably increased speed.

Also, according to the present invention, when acquiring the CM-appendant information from the server on the network, the user uses the feature of the CM as information for identification of the CM in place of the video of the CM, whereby it is made unnecessary to send the CM video itself and duplicate the CM as a literary work, which will effectively prevent the right of a copyright holder for the CM from being possibly violated.

Also, according to the present invention, when having acquired the CM-appendant information from the server on the network, the user registers the acquired appendant information into the data base in a recorder/player of the user, whereby the appendant information can be provided to the user instantly when the same CM-appendant information becomes necessary because no inquiry should be made again to the server and also the appendant information can be utilized even when the recorder/player is not in connection with the network.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described in detail below concerning the camcorder system as an embodiment thereof with reference to the accompanying drawings.

Figure 1:
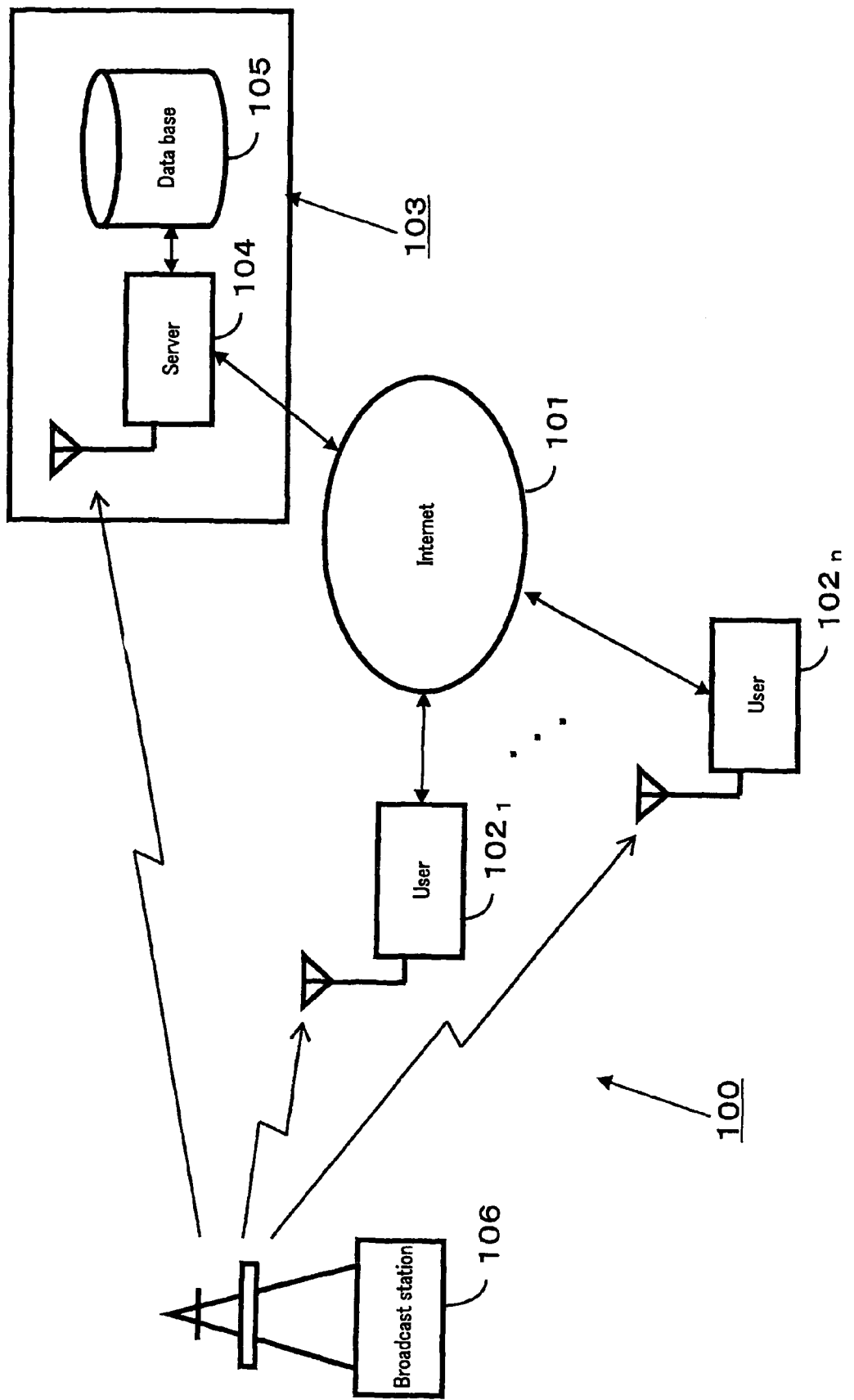
FIG. 1 is a block diagram of a CM-recording programming system according to the present invention.

The present invention is applied to a CM-recording programming system, generally indicated with a reference numeral 100, constructed as shown in FIG. 1 for example.

FIG. 1 is a conceptual drawing showing a connection of the entire CM-recording programming system 100.

As shown, the CM-recording programming system 100 includes a plurality of users 1021, ..., 102n, CM information server 103 and a broadcast station 106 to broadcast television programs, connected to the Internet 101.

The CM information server 103 includes a server 104 and data base 105. The server 104 receives a television broadcast from the broadcast station 106, detects a CM in the received television broadcast, and registers the CM, if it is a new one, into the data base 105. The manager of the server 104 collects information appendant to the new registered CM, such as names of a company and article, for which the CM is broadcasted, music used with the CM, actor or actress appearing in the CM, etc. (will be referred to "CM-appendant information" hereunder), and registers these data into the data base 105. The users 1021 to 102n receive and record a television broadcast from the broadcast station 106 while detecting a CM in the received television broadcast. When the detected CM is a new one, the users 1021 to 102n will inquire the CM information server 103 about the information appendant to that CM. The server 104 will search the data base 105 for the inquired CM and inform the users of the result of search.

When the users 1021 to 102n (will generically be referred to as "user 102" hereunder) make inquiry about CM-appendant information to the CM information server 103 via the Internet 101, data to be sent from the user 102 to the server 104 is not any a CM video (image and sound) itself but a feature of the CM video. Recently, the video compression technique has been innovated so greatly that a video can be represented by a smaller amount of data than in case it is not compressed. However, the video data, even if compressed, is still large in amount and thus it is not practical to send video data itself for the purpose of search. Also, since each CM video is protected by a copyright or the like, so sending a CM will possibly violate the right of a copyright holder. To avoid such a rights violation, a feature of a CM is extracted and used in place of the video. That is, the feature is smaller in data size than the original video and has a sufficient independence to discriminate between the original video and others. Such features include, for example, a time series of vectorized pixel values of an average image of at least one frame in a predetermined time interval disclosed in the Patent Document 3, a time series of vectorized pixel values of a thumbnail formed by dividing the average image into units of a predetermined block, etc.

Figure 2:
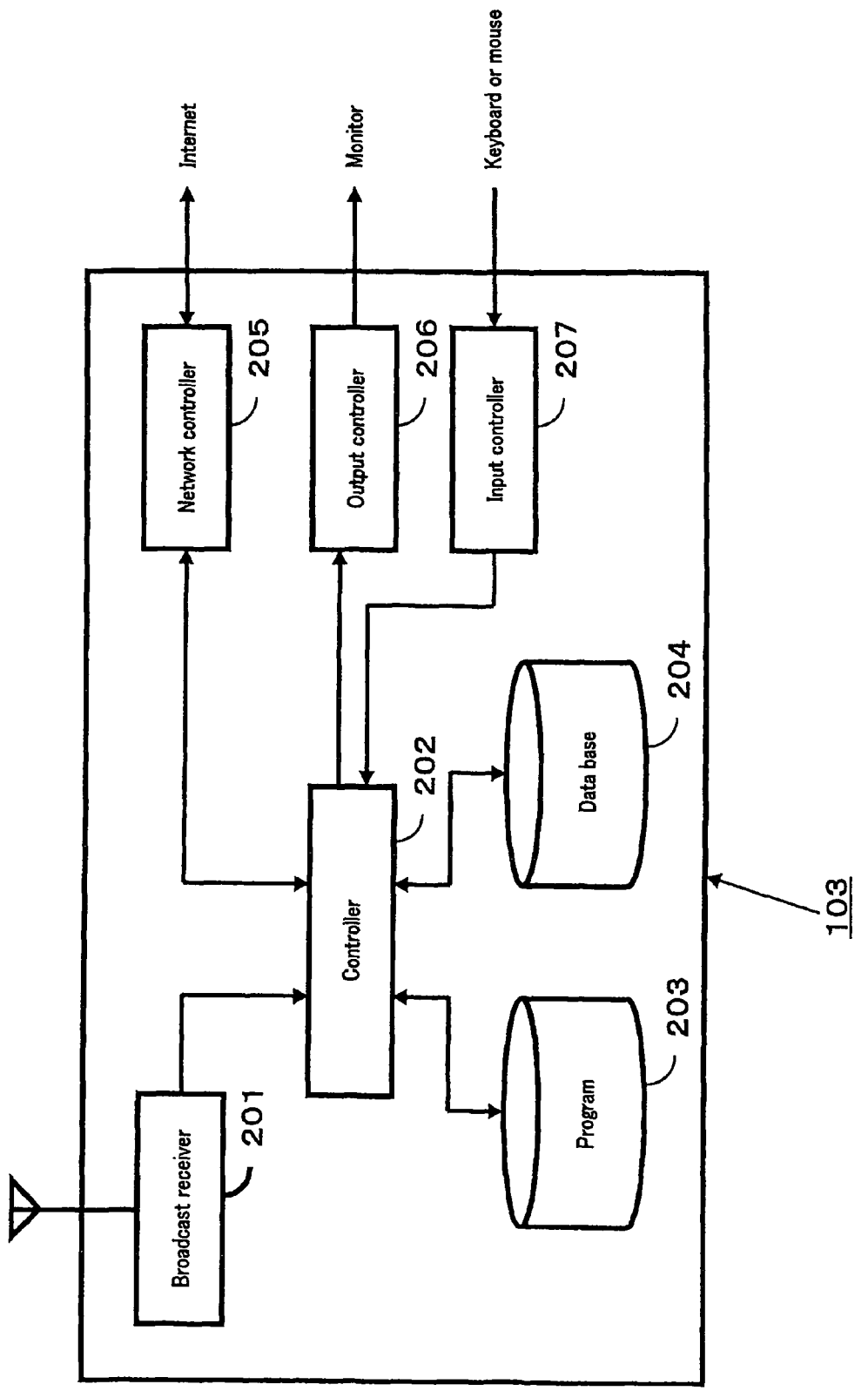
FIG. 2 is also a conceptual block diagram of a CM information server to provide CM-appendant information.

FIG. 2 is a conceptual block diagram of the CM information server 103 to provide CM-appendant information.

As shown in FIG. 1, the CM information server 103 includes the server 104 and data base 105. More specifically, the CM information server 103 includes a broadcast receiver 201 to receive a television broadcast, controller 202 which is supplied with a video signal in the broadcast signal, information incident to the video signal such as channel information, broadcast mode information, etc. from the broadcast receiver 202, and a storage unit 203, data base 204, network controller 205, output controller 206, input controller 207, etc. connected to the controller 202.

The broadcast receiver 201 receives a television broadcast, and sends the video signal and information incident to the video signal such as the channel information, broadcast information, etc. to the controller 202.

The controller 202 reads, from the storage unit 203, a program for detection of a CM in the video signal supplied from the broadcast receiver 201, and starts the CM detection. The CM detection may be effected by a method disclosed in detail in the Patent Document 2, for example. In this method, CM candidate sections each including a signal indicative of a feature pattern are extracted based on a predetermined necessary condition from an audio signal and/or video signal of a TV broadcast signal comprised of a main part and commercial message signal (first signal) as in a TV broadcast signal composed of a main part and commercial message part, appendant conditions each being an index indicative of a CM-likelihood are detected in some features in the Cm candidate sections, and the extracted appendant conditions are analyzed together to judge whether the CM candidate sections are really CM parts, thereby accurately detecting each CM. Also, all or a part of the appendant condition to be detected may be recorded and compared with other candidate CMs in a TV broadcast signal or recorded candidate CMs to make a search for a desired CM in the TV broadcast signal or a data base in which the TV broadcast signal is recorded. However, the CM detection method in the present invention may not be limited to the above one but it may be a method capable of detecting each of CMs accurately.

Figure 3:
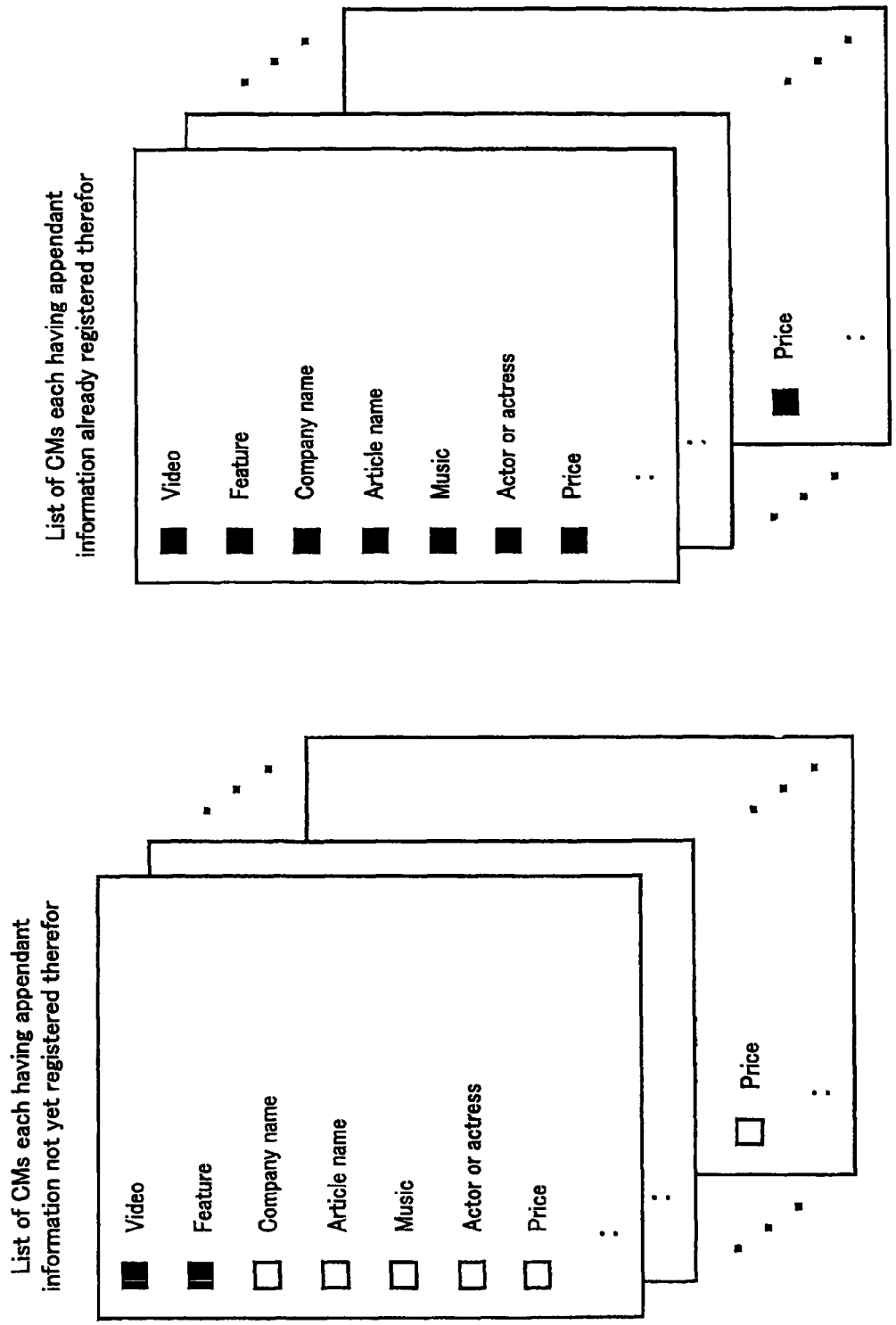
FIG. 3 schematically illustrates a list of ones of CMs having appendant information not yet registered therefor in a data base, and a list of CMs each having appendant information already registered therefor.
Figure 13:
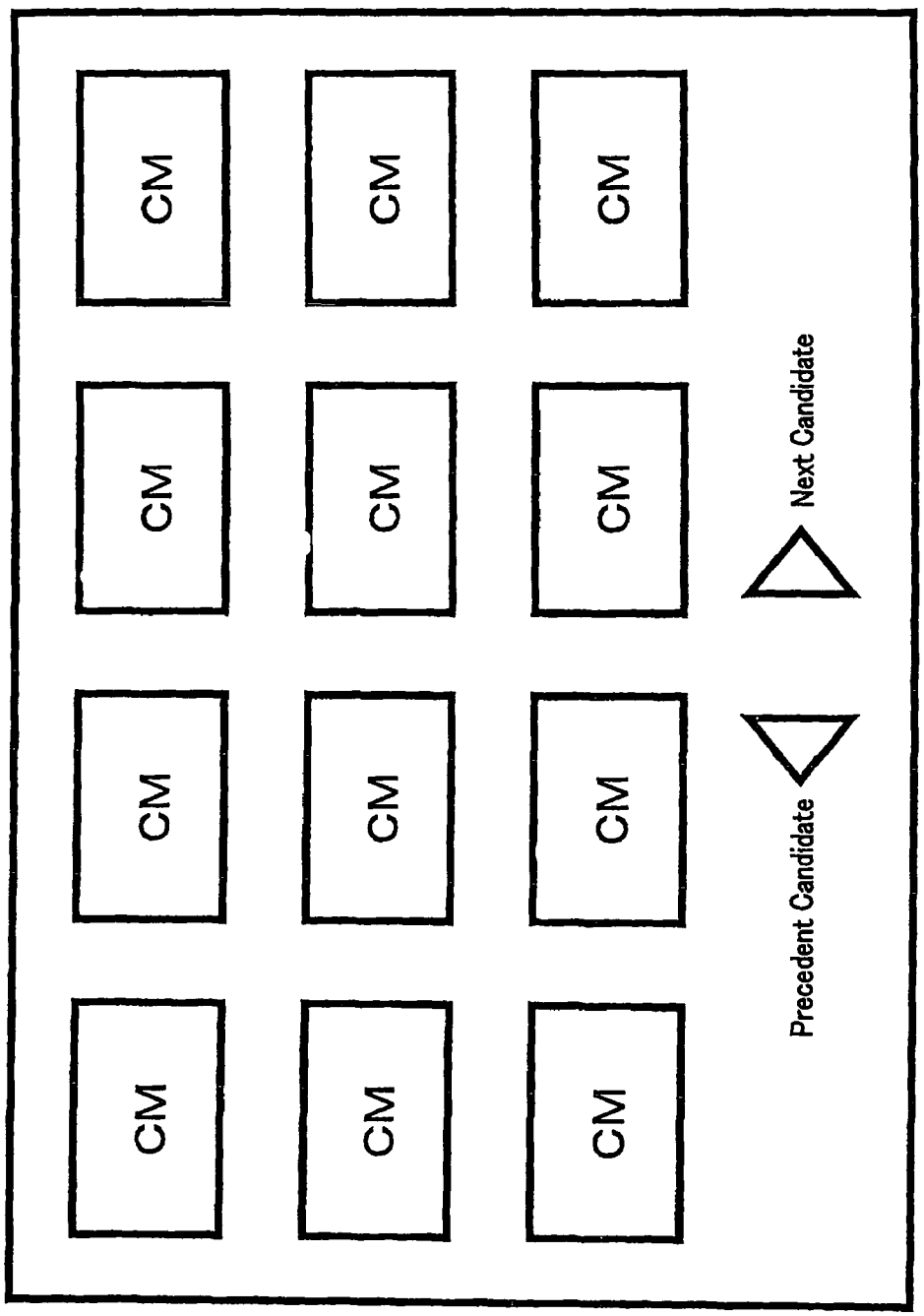
FIG. 13 shows a display screen on which a list of CMs registered in the list of CMs having appendant information not yet registered therefor.
Figure 14:
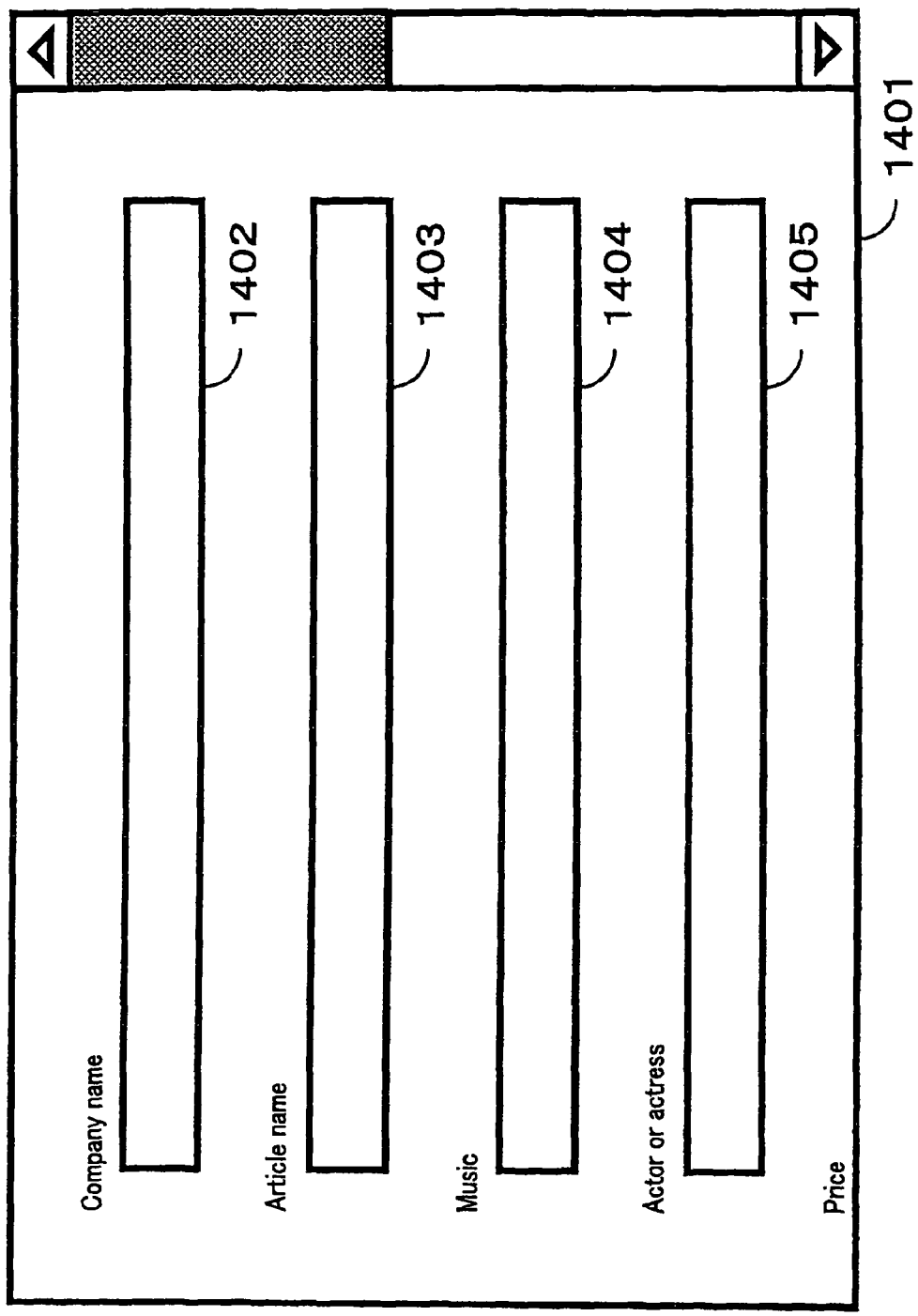
FIG. 14 shows a display screen when the server manager enters appendant information.
Figure 15:
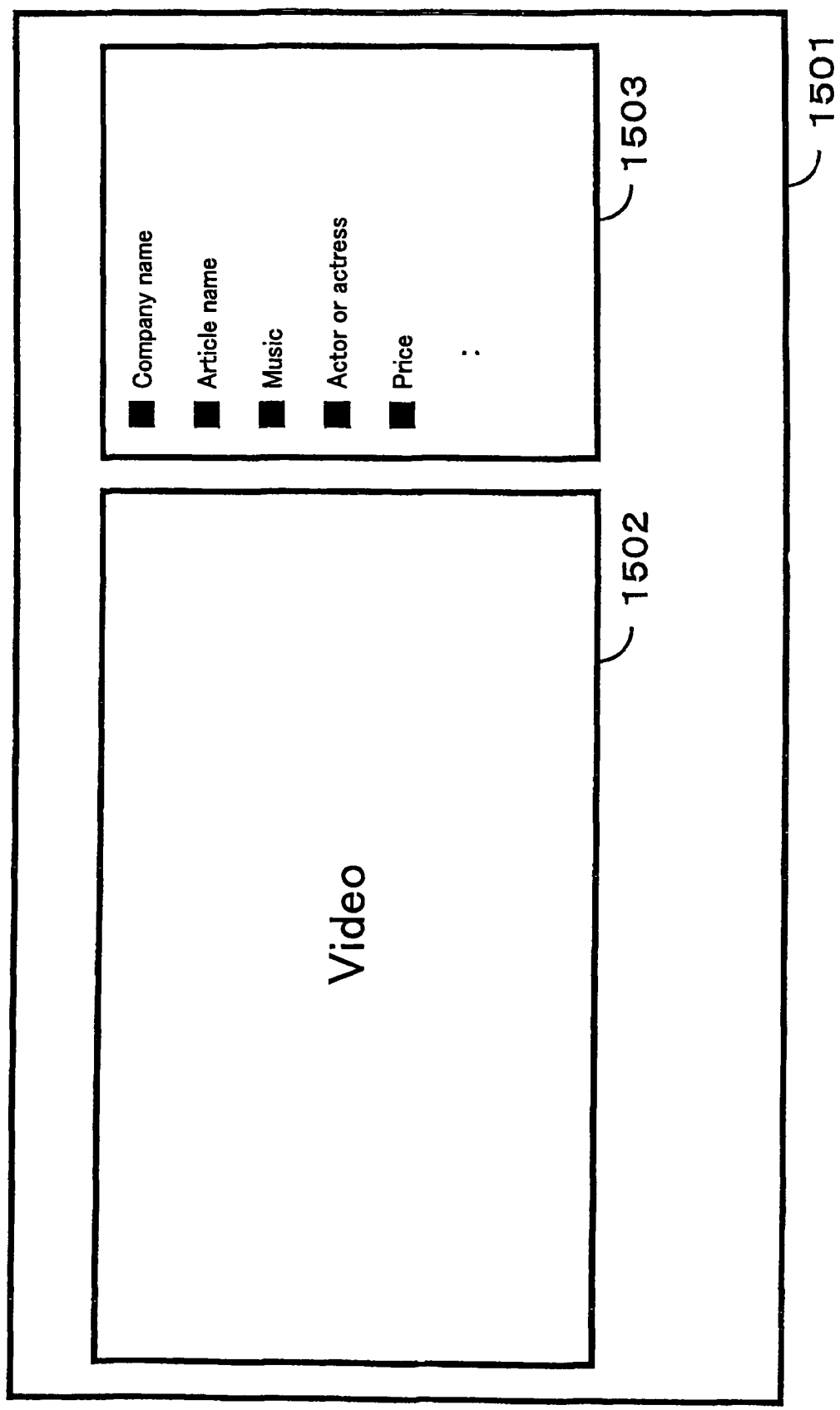
FIG. 15 shows a screen displayed on an external output unit such as monitor to inform the user of CM-appendant information.

Having detected a CM, the controller 202 reads a program for judging whether the detected CM has been already registered in the data base 204 out of the storage unit 203, and searches the data base 204. In case the same CM as the detected one is not found in the data base 204, the controller 202 registers the video of the detected CM and its feature together into the data base 204. The CM to be registered into the data base 204 is included in either a list of CMs each having appendant information not yet registered therefor or a list of CMs each having appendant information already registered therefor, for example, as shown in FIG. 3. The controller 202 first registers the new CM to be registered into the list of CMs each having appendant information not yet registered therefor, and informs a server manager of that registration by displaying a message of the CM registration on an external output unit like a monitor as shown in FIG. 13. The server manager can confirm CMs in the list of CMs each having appendant information not yet registered therefor one after another by operating a "Preceding Candidate" button and "Next Candidate" button located at the lower portion of the monitor screen. Knowing that the new CM has been registered in the list of CMs each having appendant information not yet registered therefor, the server manager checks the video of that CM stored in the data base 204, collects, by a means (not shown), information appendant to the CM, such as a company name, article name, actor (actress), etc., and supplies the information to the CM information server 103 via an external input unit such as keyboard (not shown). The display screen for entry of the appendant information by the server manager has, for example, appendant information items and input lines 1402 to 1405 arranged as shown in FIG. 14. The server manager writes information in the input lines 1402 to 1405 for the appendant information items. The controller 202 acquires the input appendant information via the input controller 207, and registers the information in the data base 204. For example, one of CMs in the list of CMs each having appendant information not yet registered therefor as shown in FIG. 3, for which appendant information has been entered, is moved from the list of CMs each having appendant information not yet registered therefor to the list of CMs each having appendant information registered therefor. For the server manager to confirm CMs registered in the list of CMs each having appendant information already registered therefor, CMs in the list of CMs each having appendant information already registered therefor are displayed in the form of a list as shown in FIG. 13, for example. When the server manager selects a specific CM from the CMs in that list, a screen will be displayed as shown in FIG. 15, for example. As shown in FIG. 15, the screen 1501 includes an area 1503 where CM-appendant information is displayed and an area 1502 where the video of that CM is displayed. In the CM-appendant information display area 1503, there is displayed the appendant information the server manager has entered.

An inquiry about a CM from the user 102 is accepted by the controller 202 via the network controller 205. CM identification information sent from the user 102 is a keyword. The controller 202 reads, out of the storage unit 203, a program for searching the data base 204 for any CM coincident with the keyword in the inquiry from the user, and searches the data base 204. In case the CM coincident with the keyword is found in the list of CMs each having appendant information not yet registered therefor, the controller 202 will send a feature of the CM to the user 102 via the network controller 205. If such a CM is not found, the controller 202 will inform the user 102 of that fact. In the former case, the information sent from the CM information server 103 to the user 102 may include appendant information such as a company name, article name, actor (or actress) appearing in the CM, music used with the CM, etc. in addition to the feature of the CM found in the data base 204.

Also, the CM-appendant information inquiry sent from the user 102 is accepted by the controller 202 via the network controller 205. CM identification information sent from the user 102 is a feature of the CM. The controller 202 reads, out of the storage unit 203, a program for judging whether the inquired CM is registered in the data base 204, and searches the data base 204. In case the inquired CM is found in the list of CMs each having appendant information already registered therefor, the controller will send the CM-appendant information to the user 102. If that CM is not found in the data base 204, the controller 202 will inform the user of that fact via the network controller 205.

Figure 4:
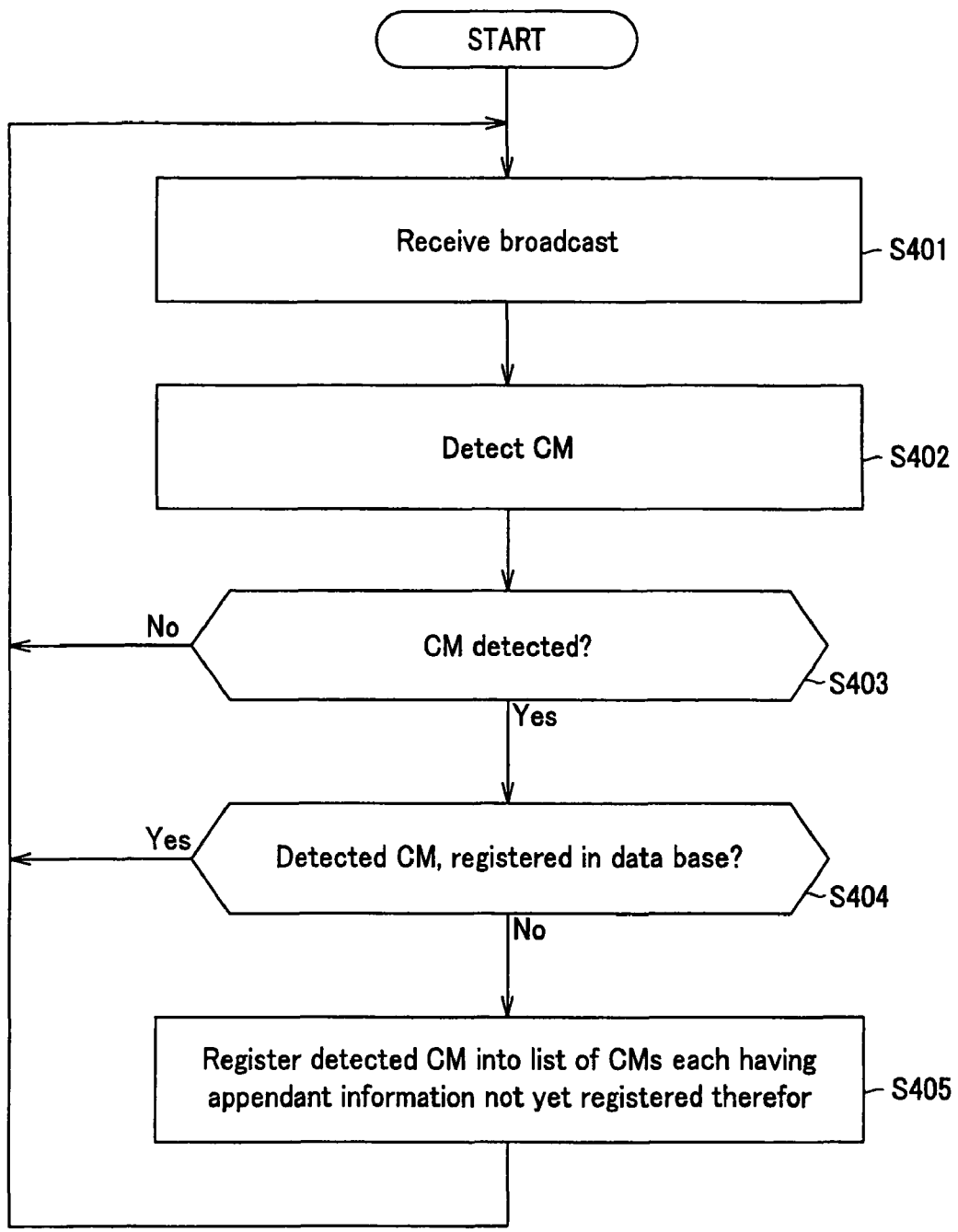
FIG. 4 shows a flow of operations made in a controller included in the CM information server in registering a new CM.

Now, the registration of a new CM by the controller 202 in the CM information server 103 will be explained below with reference to the flow diagram in FIG. 4.

First in step S401 in the registration of a new CM, the controller 202 receives a television broadcast. In case the broadcast is an analog one, the controller 202 will digitize it.

In step S402, the controller 202 detects a CM in a video signal of the received television broadcast.

In step S403, the controller 202 judges whether a CM has been detected in step S402. In case the result of judgment in step S403 is affirmative (Yes), that is, when a CM has been detected in step S202, the controller 202 will go to step S404. On the contrary, if the result of judgment in step S403 is negative (No), that is, if no CM has been detected in step S402, the controller 202 will go back to step S401.

In step S404, the controller 202 determines a feature of the detected CM, searches the data base 204 on the basis of the feature, and judges whether the detected CM has already been registered in the data base 204. In case the result of judgment in step S404 is No, that is, if the same CM as the detected one is not found registered in the data base 204, the controller 202 will go to step S405. If the result of judgment in step S404 is Yes, namely, in case the same CM as the detected one is found already registered in the data base 204, the controller 202 will return to step S401.

In step S405, the controller 202 registers the video of the detected CM and its feature into the list of CMs each having appendant information not yet registered therefor in the data base 204. After completion of the registration, the controller 202 returns to S401 in which it will repeat the registration of a new CM from the beginning.

Next, handling, in the CM information server 103, of the list of CMs each having appendant information not yet registered therefor in the data base 204 will be explained with reference to the flow diagram in FIG. 5.

First in step S501 in the handling of the list of CMs each having appendant information not yet registered therefor, the controller 202 judges whether a new CM has been registered in this list in the data base 204. In case the result of judgment in step S501 is affirmative (Yes), that is, when a new CM is found registered in the CMs list, the controller 202 will go to step S502. On the contrary, if the result of judgment is negative (No), namely, if no new CM is found registered in the CMs list, the controller 202 will exit the procedure.

In step S502, the controller 202 provides the server manager with CMs registered in the list of CMs each having appendant information not yet registered therefor. The controller 202 makes this operation by sending the list of CMs each having appendant information not yet registered therefor in the data base 204 to an external output unit such as monitor (not shown) via the output controller 206 for displaying on the external output unit. The CMs in the list of CMs each having appendant information not yet registered therefor are displayed in the form of a list on the external output unit as shown in FIG. 13, for example.

In next step S503, the server manager having checked the list of CMs each having appendant information not yet registered therefor will operate an external input unit such as keyboard to enter appendant information collected by a method (not shown). For example, the controller 202 makes this operation of entry by associating the appendant information supplied from the external input unit such as keyboard (not shown) to the controller 202 via the input controller 207 with corresponding CMs in the list of CMs each having appendant information not yet registered therefor in the data base 204. A display is made on the external output unit such as monitor to support the server manager in the operation of entry. The screen includes appendant information items and input lines 1402 to 1405 arranged as shown in FIG. 14, for example.

Further in step S504, the controller 202 moves the CM whose appendant information has been entered from the list of CMs each having appendant information not yet registered therefor to the list of CMs each having appendant information registered therefor, and exits the procedure.

Figure 5:
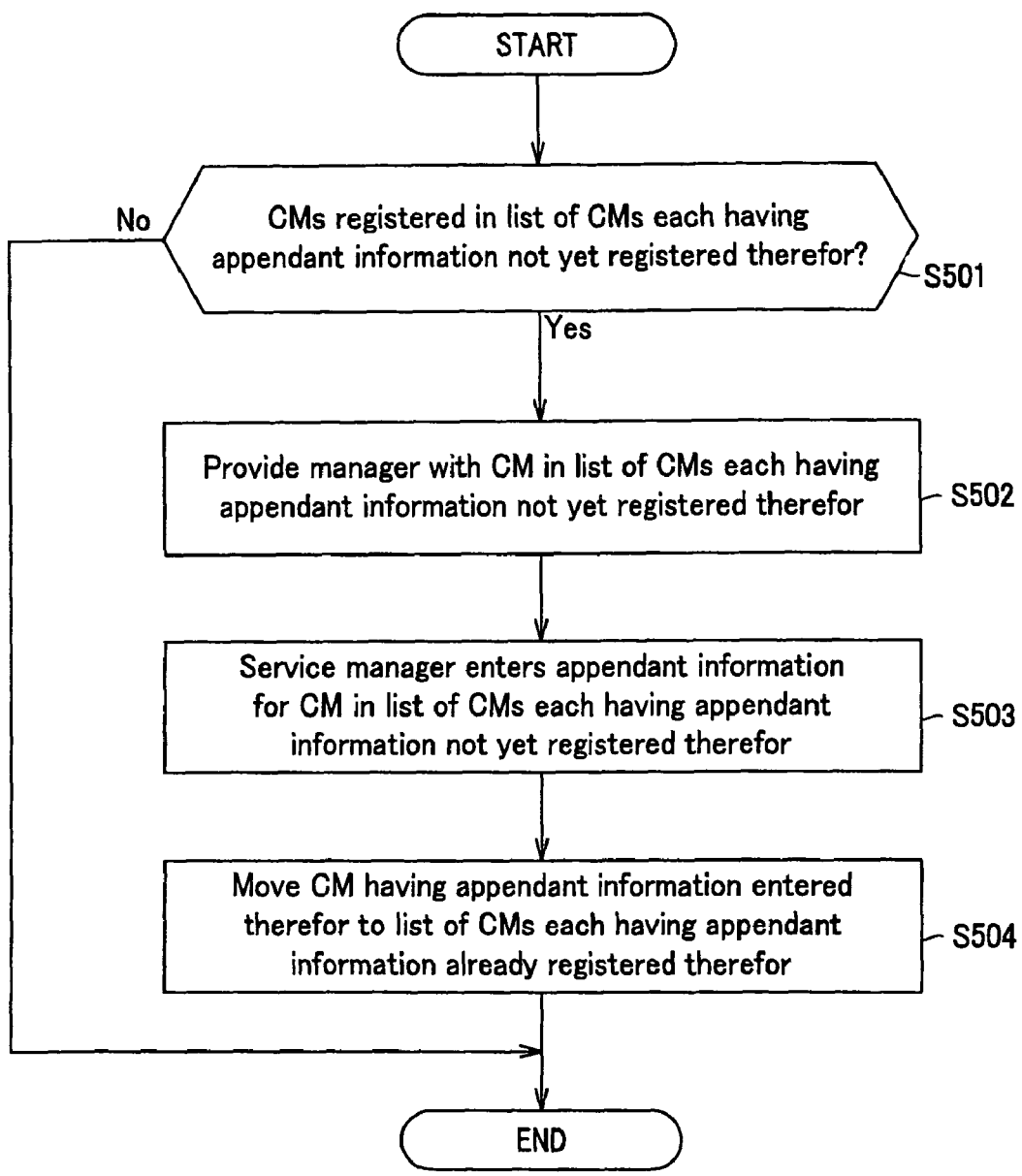
FIG. 5 also shows a flow of operations made in the CM information server in handling a list of CMs having appendant information not yet registered therefor.

Note that the series of operations shown in FIG. 5 may be set to be started each time a new CM has been registered in the data base 204, set to be started at a predetermined time, for example, at every one hour or set to be started in response to a command supplied from the server manager.

Figure 6:
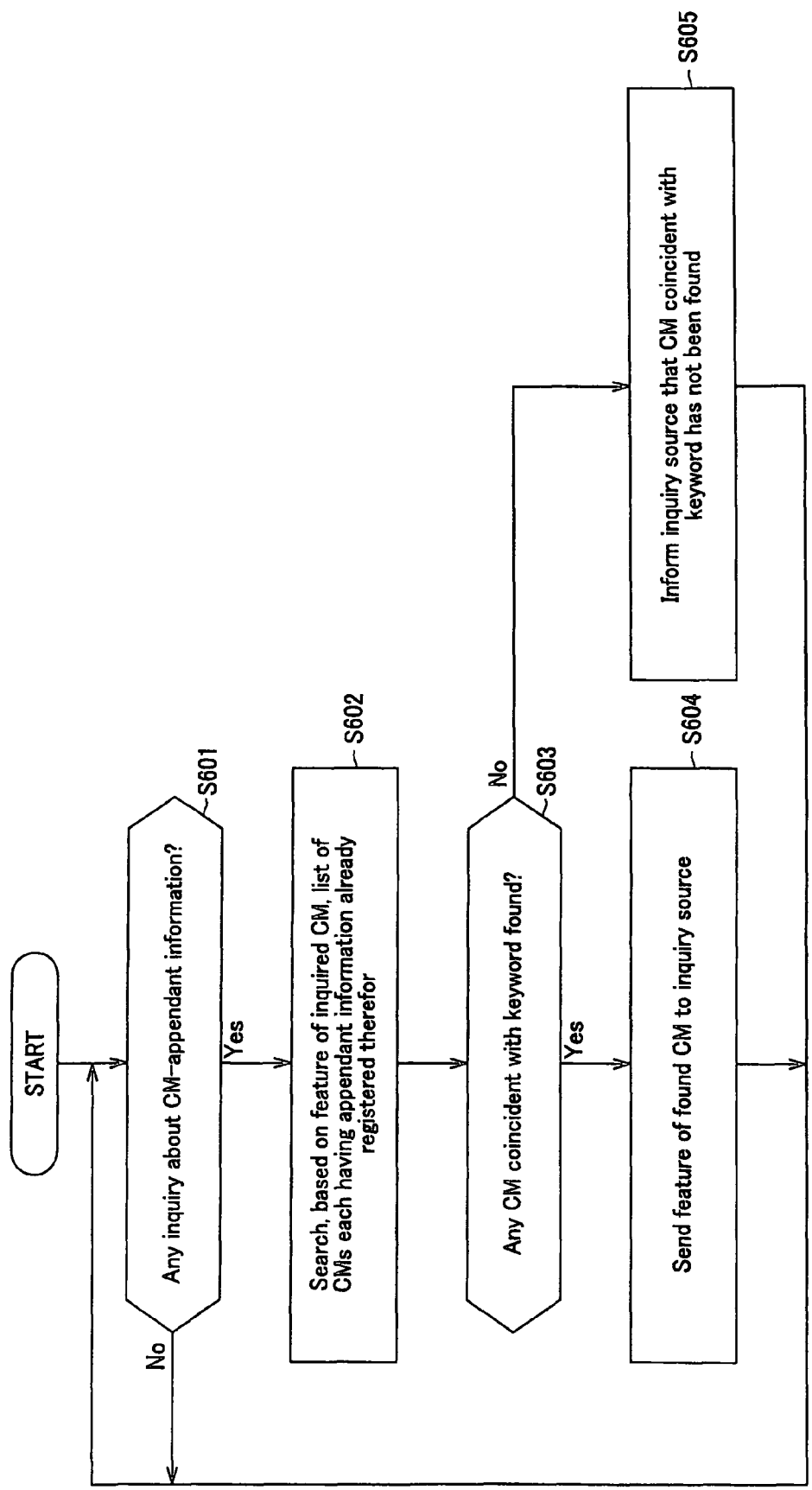
FIG. 6 shows a flow of operations made in the CM information server in response to an inquiry made from the user about CM-appendant information.

Next, coping, in the server 104, with a CM-inquiry information from the user 102 will be explained with reference to the flow diagram in FIG. 6.

First in step S601 in the coping with CM-inquiry information from the user 102, the controller 202 will judge whether inquiry has been made by the user about a CM. In case the result of judgment in step S401 is affirmative (Yes), namely, if there has been made an inquiry from the user 102, the controller 202 goes to step S602. On the contrary, if the result of judgment is negative (No), namely, if there has been made no such inquiry, the controller 202 will return to step S601.

In step S602, the controller 202 searches the list of CMs each having appendant information already registered therefor in the data base 204 on the basis of the keyword sent from the user 102. The controller 202 makes this operation of searching by receiving an inquired keyword via the network controller 205 and searching the data base 204 for a list of CMs each having appendant information already registered therefor on the basis of the keyword.

In next step S603, the controller 204 judges whether a CM having appendant information coincident with the inquired keyword has been found in the data base 204. In case the result of judgment in step S603 is affirmative (Yes), that is, if such a CM has been found, the controller 202 goes to step S604. On the contrary, if the result of judgment is negative (No), namely, if no such a CM has been found, the controller 202 goes to step S605.

In step S604, the controller 202 sends a feature of the CM found to the user 102 having made the CM inquiry, and returns to step S601.

Also in step S605, the controller 202 sends information indicating that no such a CM has been found to the user 102 having made the CM inquiry, and returns to step S601. The controller 202 sends the information to the user 102 having made the CM inquiry by sending the information to the user 102 via the network controller 205, for example.

Figure 7:
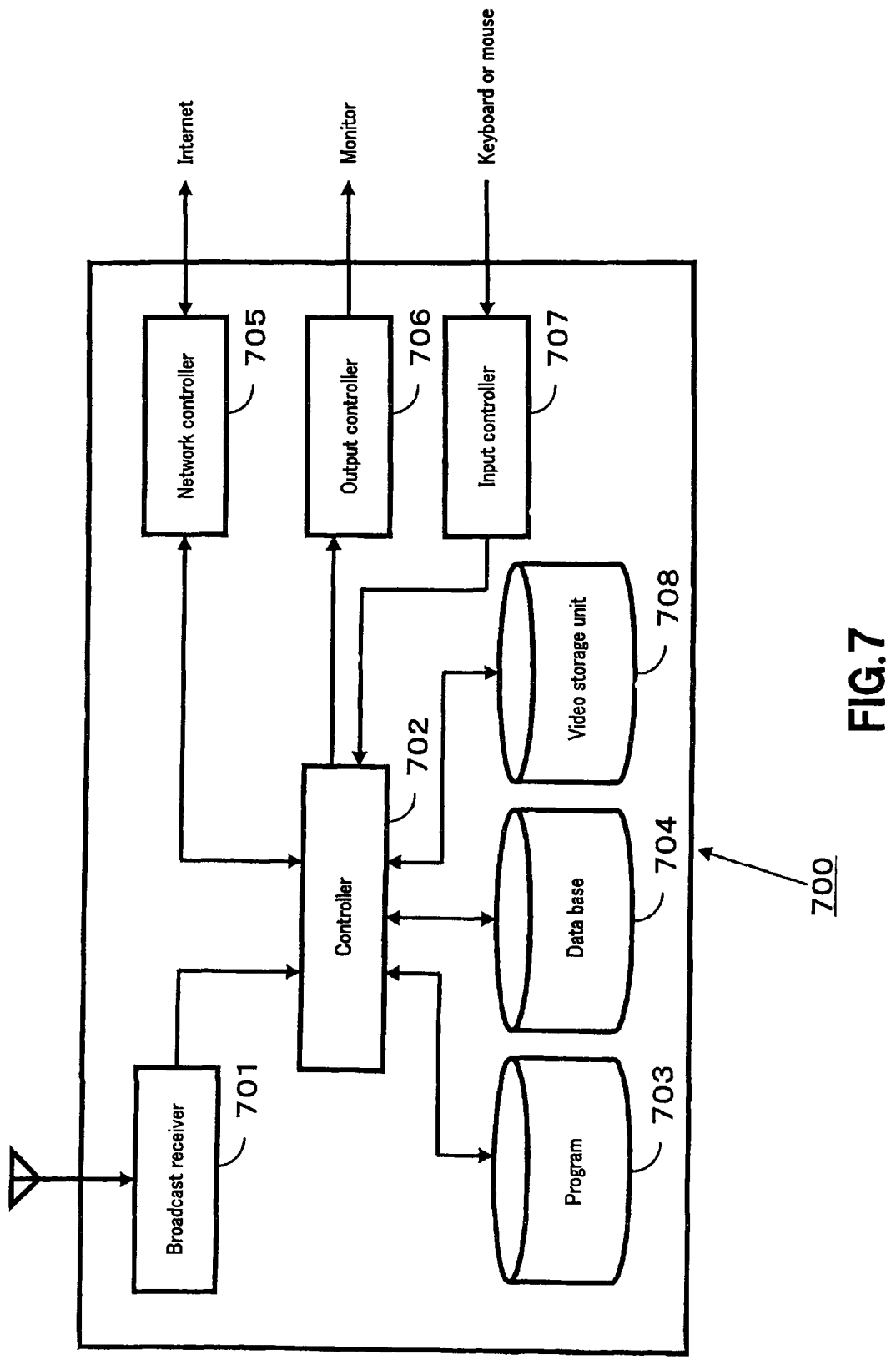
FIG. 7 is a conceptual block diagram of a recorder/player in which CM-appendant information is utilized.

FIG. 7 is a conceptual block diagram of a recorder/player in which the CM-appendant information is utilized. The recorder/player is generally indicated with a reference numeral 700.

As shown, the recorder/player 700 includes a broadcast receiver 701 to receive a television broadcast, controller 702 supplied with a video signal from the broadcast receiver 701, and a storage unit 703, data base 704, network controller 705, output controller 706, input controller 707, video storage unit 708, etc. connected to the controller 702.

The broadcast receiver 701 receives a television broadcast, and supplies the received video to an external output unit such as monitor (not shown) via the output controller 706. Thus the user watches the received broadcast program on the external output unit.

For recording a television broadcast, the user operates an external input unit such as keyboard, mouse, remote commander or the like to enter a command. The controller 702 receives the input command via the input controller 707.

The controller 702 is supplied with a broadcast program on a user-designated broadcast channel from the broadcast receiver 701, and stores it in the video storage unit 708 while reading a program for detecting a CM in a video signal supplied from the broadcast receiver 701 out of the storage unit 703 and starting detecting a CM.

The CM detection may be effected by the method disclosed in detail in the Patent Document 2, for example. In this method, CM candidate sections each including a signal indicative of a feature pattern are extracted based on a predetermined necessary condition from an audio signal and/or video signal of a TV broadcast signal comprised of a main part and commercial message signal (first signal) as in a TV broadcast signal composed of a main part and commercial message part, appendant conditions each being an index indicative of a CM-likelihood are detected from some features in the CM candidate sections, and the extracted appendant conditions are analyzed together to judge whether the CM candidate sections are really CM parts, thereby accurately detecting each CM. Also, all or a part of the appendant condition to be detected may be recorded and compared with other candidate CMs in a TV broadcast signal or recorded candidate CMs to make a search for a desired CM in the TV broadcast signal or a data base in which the TV broadcast signal is recorded. However, the CM detection method in the present invention may not be limited to the above method but it may be a method capable of detecting each of CMs accurately.

Having detected a CM, the controller 702 reads a program for judging whether the detected CM has already been registered in the data base 704 out of the storage unit 703, and searches the data base 704. In case the same CM as the detected one is not found in the data base 704, the controller 702 registers the video of the detected CM (and/or recorded position of the video of a CM in a recorded program) and its feature together into the data base 704. The CM to be registered into the data base 704 is included in either a list of CMs each having appendant information not yet registered therefor or a list of CMs each having appendant information already registered therefor as shown in FIG. 3, for example. The controller 702 first registers the new CM to be registered in to the list of CMs each having appendant information not yet registered therefor.

To watch the recorded program, the user enters a command by operating a keyboard, mouse, remote commander or the like. The controller 702 receives the input command via the input controller 707. The controller 702 reads the user-designated recording program out of the video storage unit 708, and supplies it to an external output unit such as monitor (not shown) via the output controller 706. Thus, the user can watch the recorded program.

Figure 20:
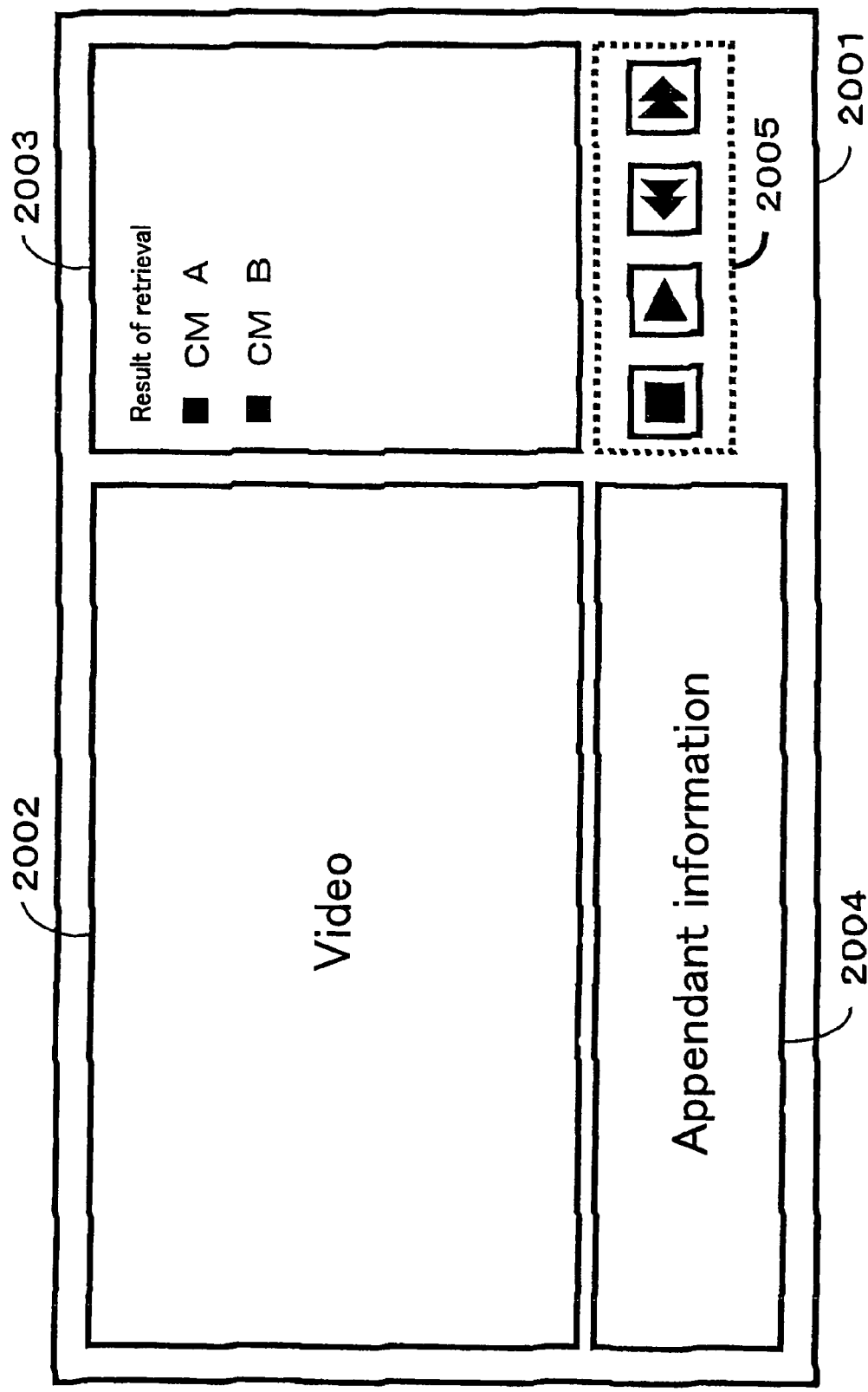
FIG. 20 shows an example of the display screen at the recorder/player.

To make a search for a CM, the user enters a command such as keyword for searching by operating an external input unit such as keyboard, mouse, remote commander or the like (not shown). The controller 702 receives the input command via the input controller 707, and sends it to the CM information server 103 via the network controller 705. A response from the CM information server 103 is sent to the controller 702 via the network controller 705. In case a feature of the CM is sent as a response from the CM information server 103, the controller 702 reads, from the storage unit 703, a program for searching the list of CMs each having appendant information not yet registered therefor and list of CMs each having appendant information already registered therefor in the data base 704 on the basis of the feature, searches the data base 704, and outputs CMs coincident in feature with each other to an external output unit such as monitor (not shown) via the output controller 706 to inform the user of the search result. In case there is a corresponding CM in the list of CMs each having appendant information not yet registered therefor in the data base 704, the controller 702 will move that CM to the list of CMs each having appendant information already registered therefor. FIG. 20 shows a screen 2001 of the external output unit such as monitor to inform the user of the search result. The screen 2001 includes, for example, an area 2003 in which a list of CMs corresponding to the keyword is displayed and an area 2002 in which the video of the CMs is displayed. The screen 2001 may additionally include an area 2004 in which appendant information of the CMs is displayed and a control area 2005 provided to select a to-be-reproduced CM from the CMs list in the area 2003.

In case the user has wanted to acquire information appendant to a CM while watching a television broadcast program or recorded program, he or she enters a command by operating an external input unit such as keyboard, mouse, remote commander or the like (not shown). The controller 702 receives the input command via the input controller 707. For example, when the user pushes a "CM inquiry" button provided, if any, at the external input unit, the controller 702 interprets the button operation as a command for inquiry about a CM being supplied from the output controller 706. The controller 702 acquires a feature of the user-designated CM from the data base 704, and sends it to the CM information server 103 via the network controller 705. A response from the CM information server 103 will arrive at the controller 702 via the network controller 705. In case appendant information has been sent as a response from the CM information server 103, the controller 702 will provide the appendant information to the user 102 by supplying the appendant information to an external output unit such as monitor (not shown) via the output controller 706, and move the CM from the list of CMs each having appendant information not yet registered therefor in the data base 704 to the list of CMs each having appendant information already registered therefor. As shown in FIG. 15, a screen, indicated with a reference numeral 1501, is displayed on the external output unit such as monitor for informing the user of the CM-appendant information. The screen 1501 includes, for example, an area 1502 where the video of the CM is displayed and an area 1503 where the CM-appendant information is displayed.

Here, registration of a new CM in the recorder/player 700 of the user 102 will be explained with reference to the flow diagram in FIG. 8.

First in step S801 of the registration of a new CM, the controller 702 receives a television broadcast. In case the broadcast is an analog one, the controller 702 will digitize it and then record the received video as necessary.

In step S802, the controller 702 detects a CM in a video signal of the received television broadcast.

In step S803, the controller 702 judges whether a CM has been detected in step S802. In case the result of judgment in step S803 is affirmative (Yes), that is, when a CM has been detected in step S802, the controller 702 will go to step S804. On the contrary, if the result of judgment in step S803 is negative (No), that is, if no CM has been detected in step S802, the controller 802 will go back to step S801.

In step S804, the controller 702 determines a feature of the detected CM, searches the data base 704 on the basis of the feature, and judges whether the detected CM has already been registered in the data base 704. In case the result of judgment in step S804 is negative (No), that is, if the same CM as the detected one is not found registered in the data base 704, the controller 702 will go to step S805. If the result of judgment in step S804 is affirmative (Yes), namely, in case the same CM as the detected one is found already registered in the data base 704, the controller 702 will return to step S801.

In step S805, the controller 702 registers the video of the detected CM and its feature together into the list of CMs each having appendant information not yet registered therefor in the data base 704. After completion of the registration, the controller 702 returns to S801 in which it will repeat the registration of a new CM from the beginning.

Figure 8:
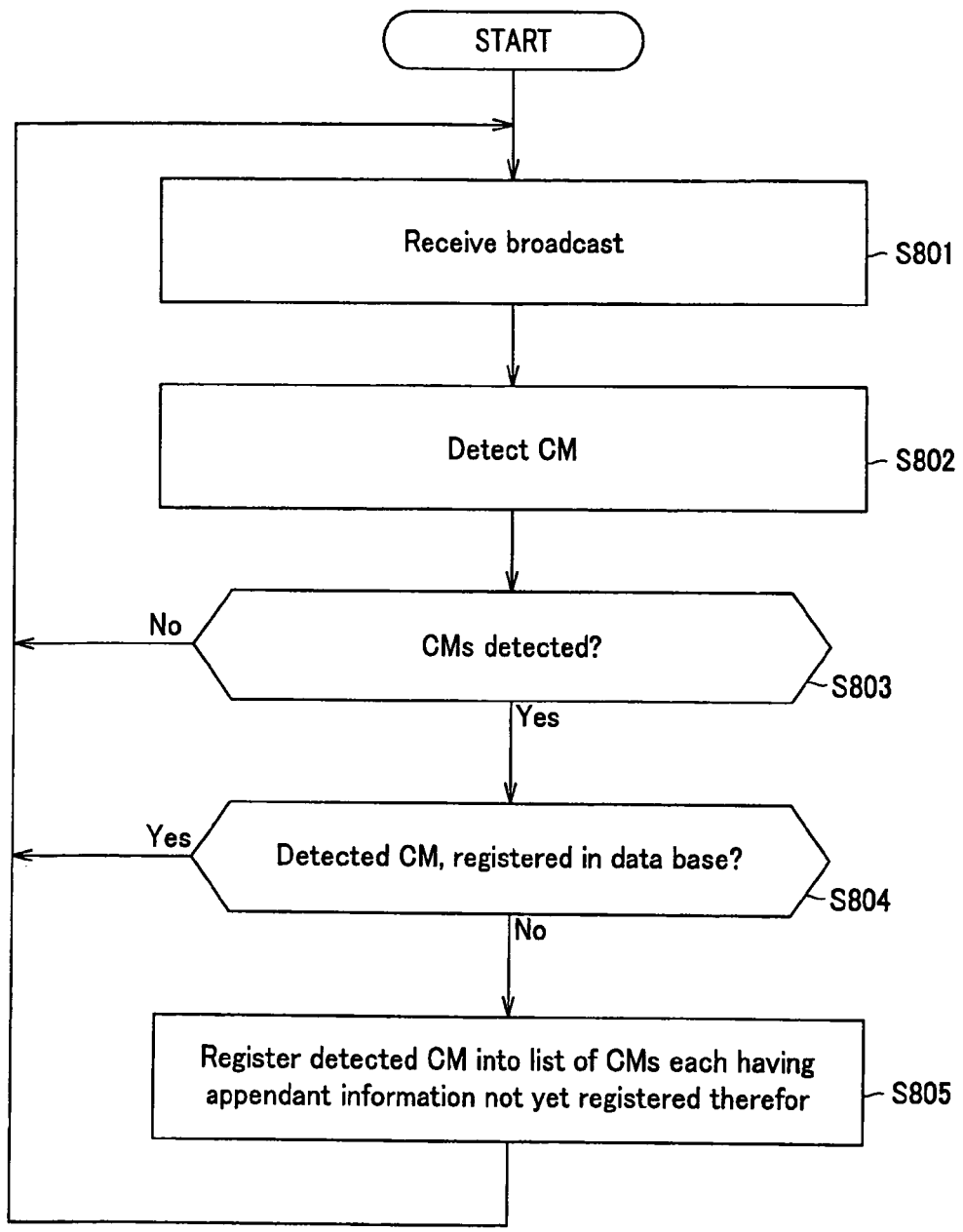
FIG. 8 shows a flow of operations made in the recorder/player in registering a new CM.

In the flow of operations in the registration of a new CM shown in the flow diagram in FIG. 8, first a CM is detected, and then a feature of the detected CM is determined. This is as shown in FIG. 18A. That is, a CM 1802 is detected in a video signal 1801 of a television signal, and then a feature 1803 of the detected CM is calculated.

Figure 18B:
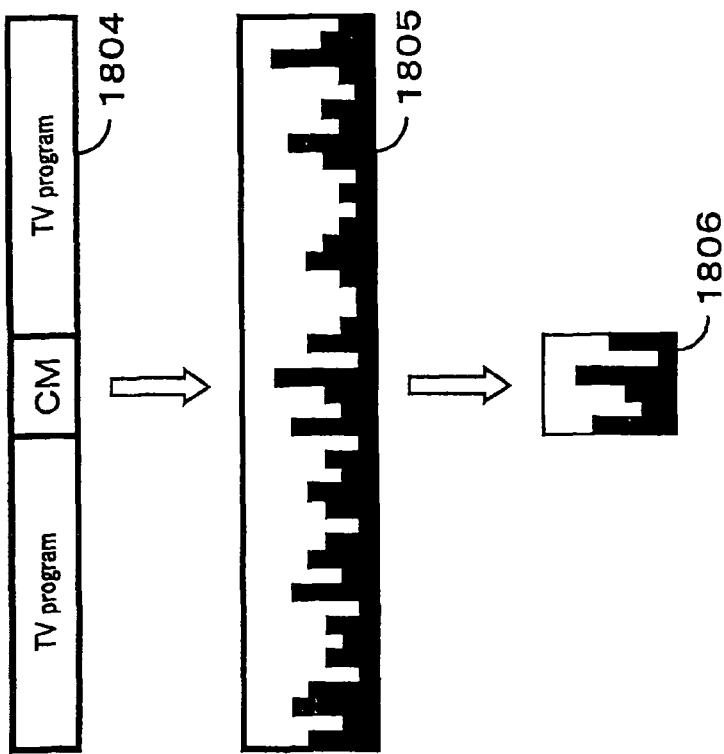
FIG. 18 shows an example of extraction of a feature such as video signal in television broadcast.
Figure 18A:
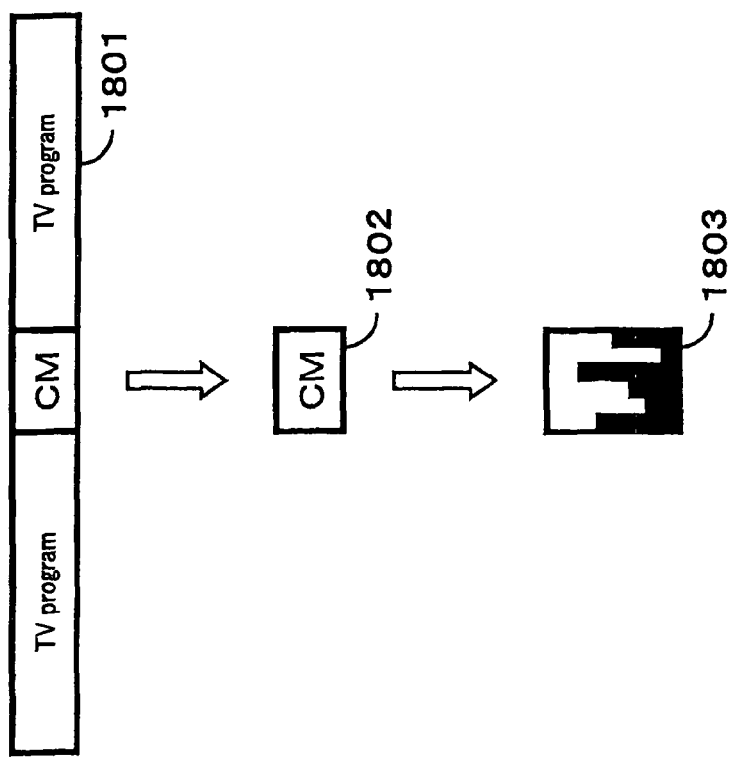

However, a new CM may be registered by calculating a feature 1805 of either any CM incident to a television broadcast or main part of the television broadcast from a video signal 1804 of the television broadcast while locating the CM and extracting a part 1806 corresponding to the CM from the calculated feature as shown in FIG. 18B. In this case, operations will be made as follows in registering a new CM as shown in the flow diagram in FIG. 8.

In step S801, the controller 702 receives a television broadcast. In case the broadcast is an analog one, the controller 702 will digitize it and then record the received video as necessary. In step S802, the controller 702 detects a CM in the video signal of the received television broadcast. In step S803, the controller judges whether the CM has been detected in step S802. In case the result of judgment in step S803 is affirmative (Yes), that is, if a CM has been detected, the controller 702 goes to step S804. On the contrary, if the result of judgment is negative (No), namely, when no CM has been detected, the controller 702 returns to step S801. In step S804, the controller 702 extracts a feature of the detected CM from the feature calculated in step S801, searches the data base 704 on the basis of the feature, and judges whether the detected CM has already been registered in the data base 704. In case the result of judgment in step S804 is negative (No), that is, if the same CM as the detected one has not been registered in the data base 704, the controller 702 goes to step S805. On the contrary, if the result of judgment is affirmative (Yes), namely, if the same CM as the detected one has already been registered in the data base 704, the controller 702 returns to step S801. In step S805, the controller 702 registers the video of the detected CM and its feature into the list of CMs each having appendant information not yet registered therefor. After completion of the registration, the controller 702 returns to step S801 where it will repeat the new-CM registration from the beginning.

Next, CM-information inquiry made by the recorder/player 700 of the user 102 to the CM information server 103 will be explained with reference to the flow diagram in FIG. 9. This CM-information inquiry operation is effected when the user instructs the controller 702 to acquire CM information from the CM information server 103.

First in step S901 in this CM-information inquiry, the user enters a keyword. In this operation, the controller 702 acquires, via the input controller 707, search information such as keyword entered by the user by operating an external input unit such as keyboard, mouse, remote commander or the like.

In step S902, the controller 702 sends the input keyword to the CM information server 103. In this sending operation, the controller 702 sends the keyword to the CM information server 103 via the network controller 705, for example.

In step S903, the controller 702 receives the CM feature sent from the CM information server 103. In this receiving operation, the controller 702 receives the CM feature from the CM information server 103 via the network controller 705.

In step S904, the controller 702 judges whether a CM feature coincident with the inquired keyword is included in information sent from the CM information server 103. In case the result of judgment in step S904 is affirmative (Yes), namely, when the CM feature is included in the information from the CM information server 103, the controller 702 goes to step S905. On the contrary, if the result of judgment is negative (No), that is, if no such CM feature is included in the information, the controller 702 will inform the user that no such CM feature is not included in the information from the CM information server 103 and exit the procedure. The controller 702 informs the user of the fact by sending the information to an external output unit such as monitor (not shown) via the output controller 706.

In step S905, the CMs list is searched for a CM whose feature is coincident with the feature sent from the server. Namely, the controller 701 reads a search program from the storage unit 703 and searches the data base 704 for a CM having a feature coincident with the feature acquired from the CM information server 103.

Figure 21:
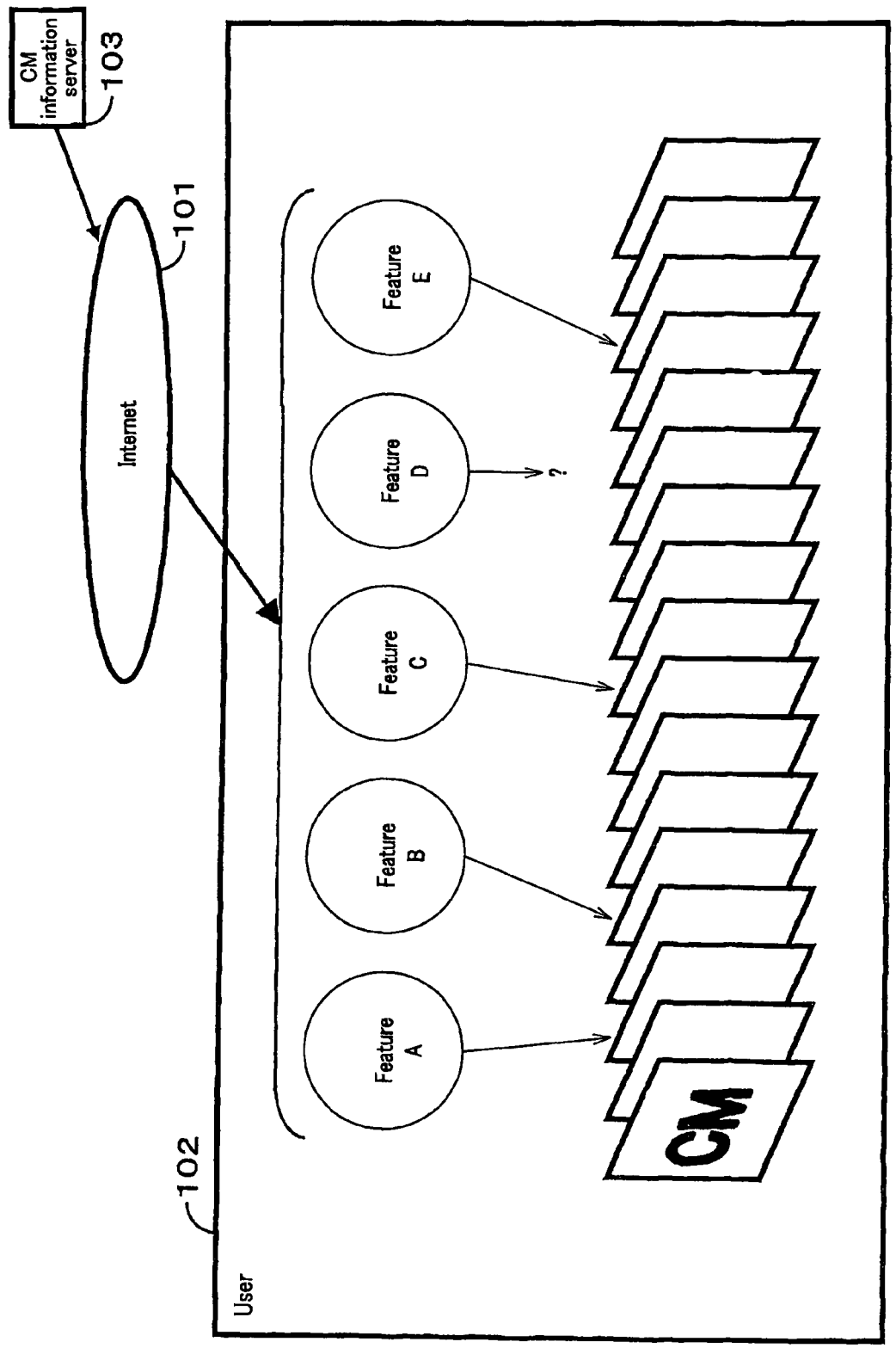
FIG. 21 schematically illustrates feature-based search in the recorder/player.

The operation of this search will be briefly explained here below with reference to FIG. 21. CMs whose features are coincident with the keyword the user 102 has sent to the CM information server 103 are sent to the user 102 from the CM information server 103 via the Internet 101. In the example shown in FIG. 21, five CMs coincident with the keyword have features A, B, C, D and E, respectively. The five CM features are compared with those in the CMs list. A CM whose feature is coincident with a CM feature, if any, in the CMs list can be said to be coincident with the keyword. There is possibility that features of the CMs sent from the CM information server 103 are not coincident with those of any CMs in the CMs list. In the example shown in FIG. 21, the feature D is not coincident with the features of any CMs in the CMs list, which will be possible when a corresponding CM has not yet been recorded in the recorder/player 700 of the user 102.

Figure 22:
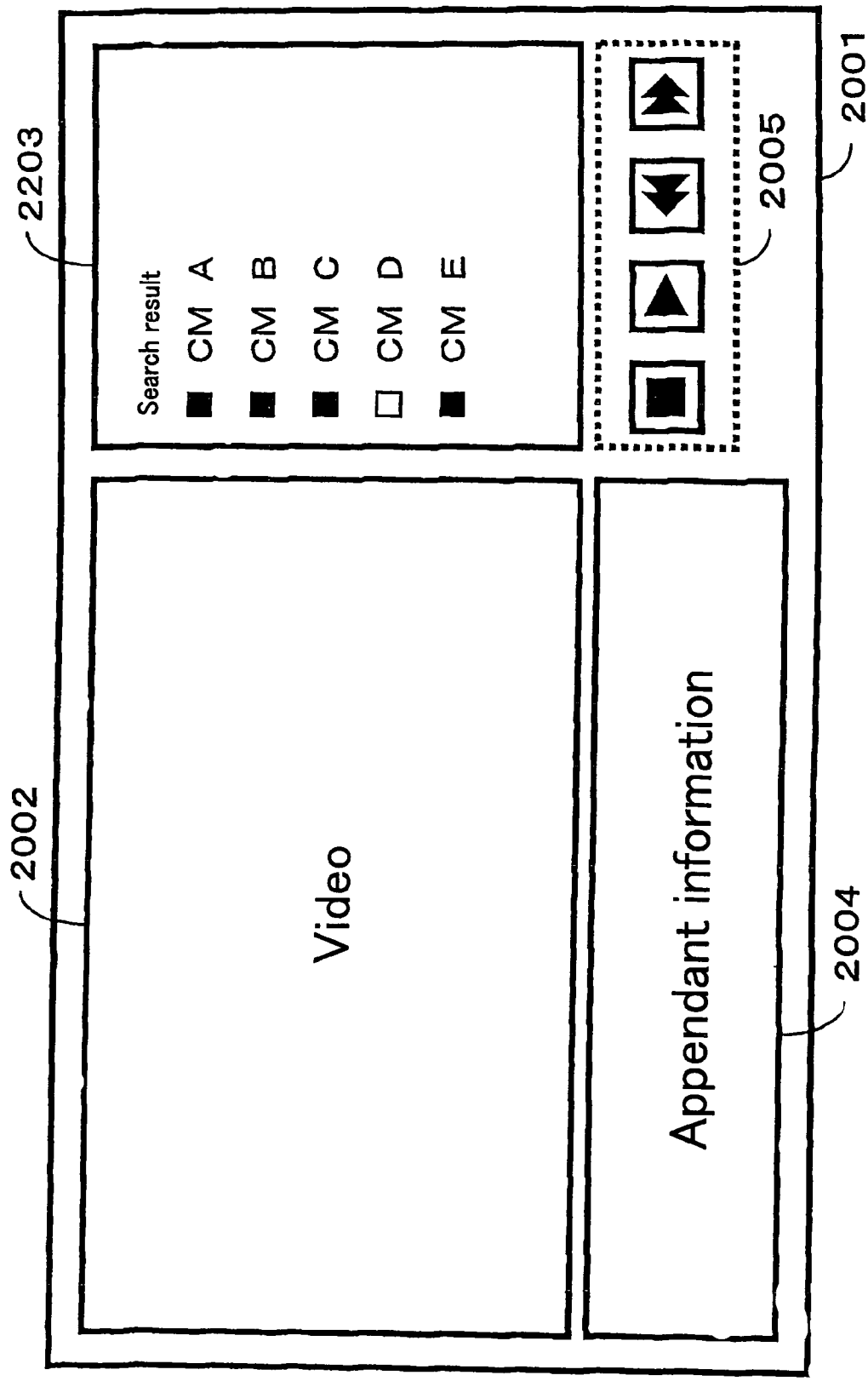
FIG. 22 shows another example of the display screen at the recorder/player.

In step S906, the controller 702 informs the user 102 of the result of the search made on the basis of the features acquired from the CM information server 103, while associating the appendant information including the keyword with a corresponding CM in the list of CMs each having appendant information not yet registered therefor and moving the corresponding CM to the list of CMs each having appendant information already registered therefor. The controller 702 makes this information to the user 102 by displaying a screen as shown in FIG. 22 on an external output unit such as monitor (not shown) via the output controller 706. FIG. 22 shows an example of the result of search from the CM information server 103 in FIG. 21. In an area 2203 where the result of search is to be displayed, there is displayed a list of five CMs sent from the CM information server. Since videos of a CM A having a feature A, CM B having a feature B, CM C having a feature C and a CM E having a feature E exist in the recorder/player 700 of the user 102, the small squares before them are blackened. However, since a video of a CM D having a feature D is not existent in the recorder/player 700 of the user 102, the small square before the CM D remains not blackened for discrimination from the other CMs. By operating a control area 2005, the user can reproduce the detected CMs in a video display area 2002. Of course, the CM D whose video is not recorded cannot be reproduced.

As having been described above, even if CM features coincident with a keyword are acquired from the server, the user 102 cannot view such CMs unless CMs coincident in feature with such CMs are recorded in the recorder/player 700 of the user 102.

Figure 23:
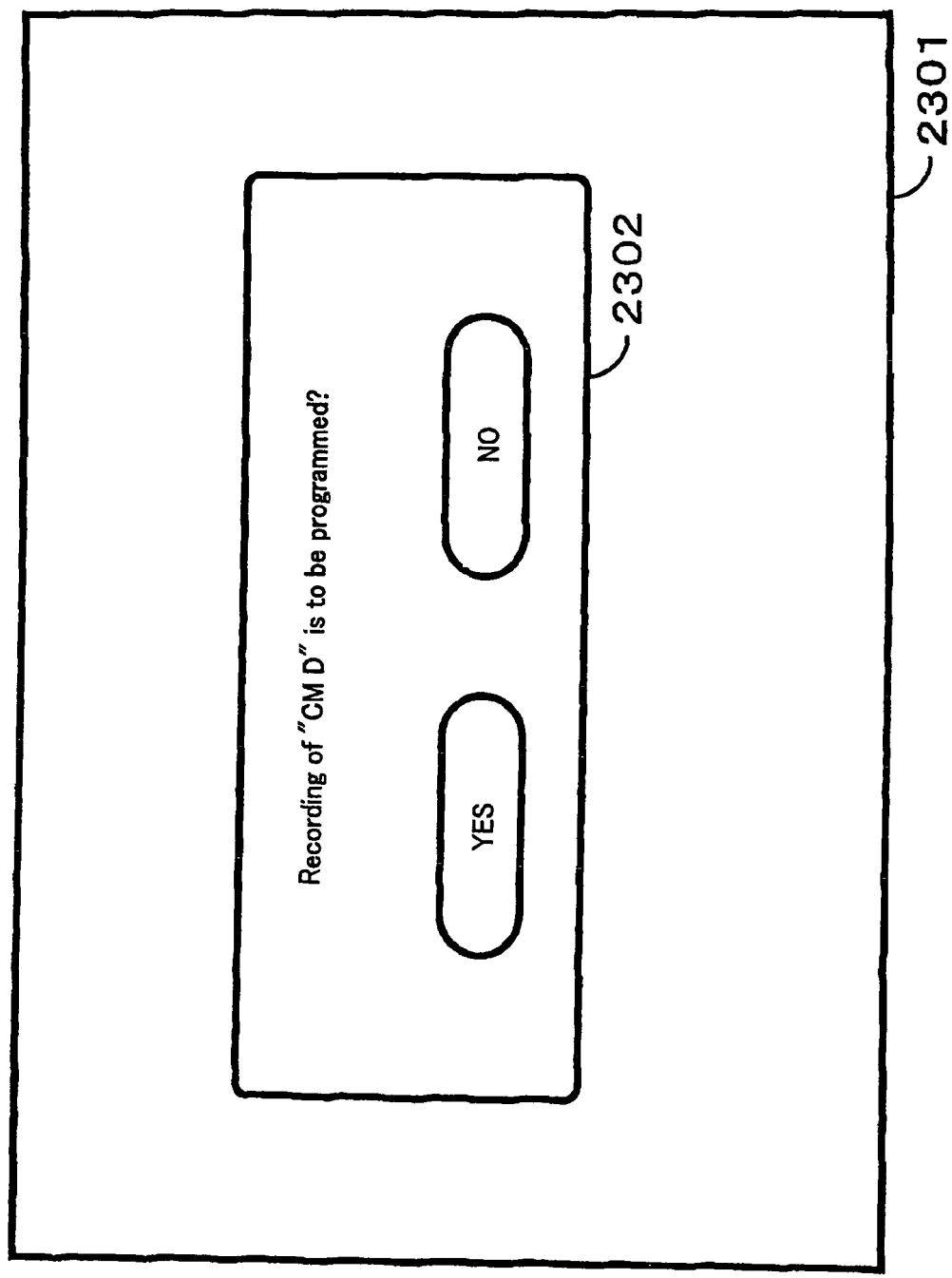
FIG. 23 shows still another example of the display screen at the recorder/player.
Figure 24:
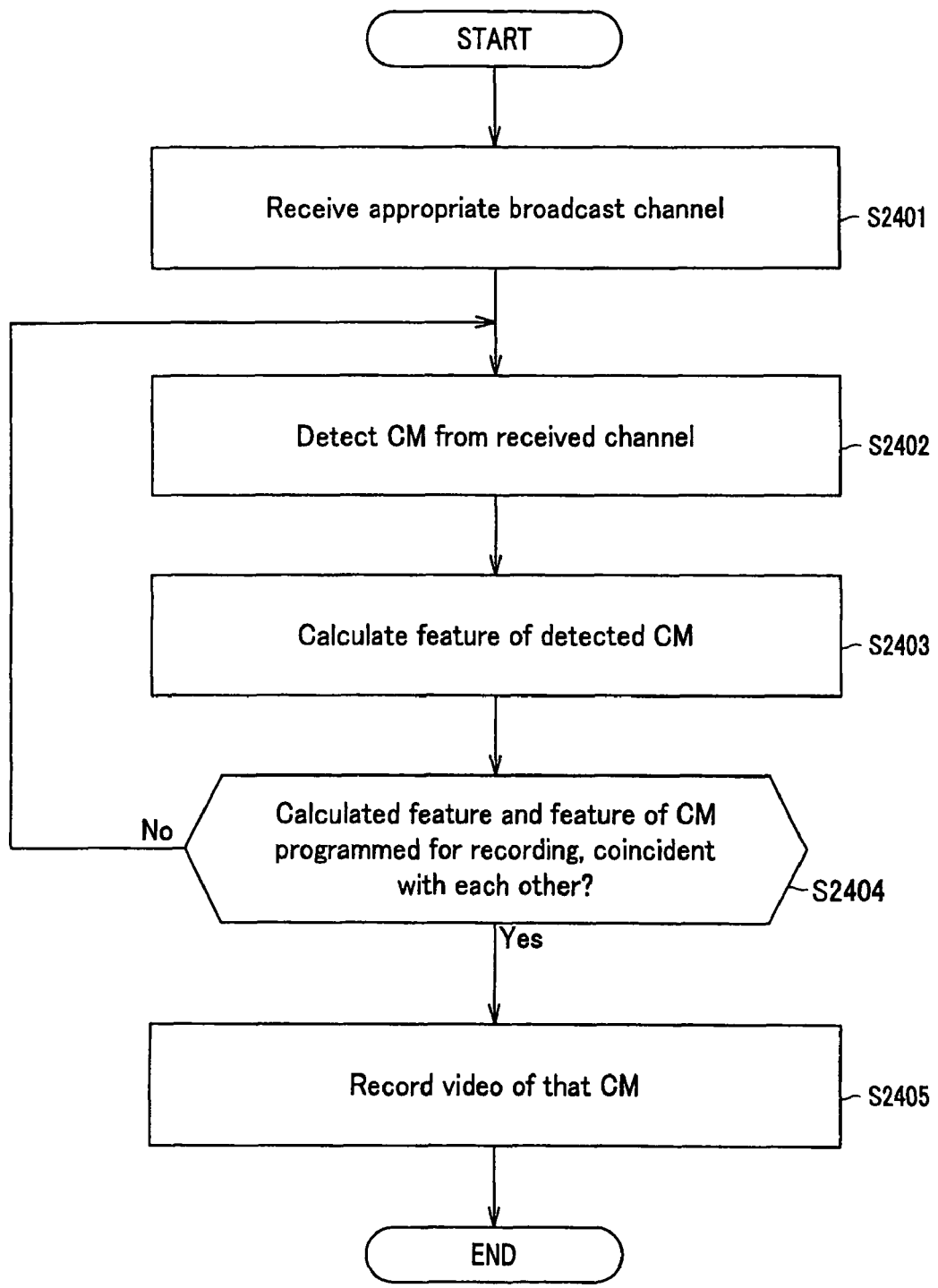
FIG. 24 shows a flow of operations made in the recorder/player in programming CM recording.

However, there is a case in which use of features acquired from the CM information server 103 permits to acquire CMs having the features. For example, it is assumed that when the user selects the CM D in the result-of-search display area 2203 in FIG. 22, a screen as shown in FIG. 23 will be displayed. A message display area 2302 is displayed on the screen 2301 to prompt the user to select whether it should be programmed to record the CM D. When the user selects "YES", the recording will be programmed. Although it is not normally known to the user when and on which broadcast channel a CM is to be broadcasted, CM recording is programmable as in the flow diagram shown in FIG. 24, for example.

First in step S2401, the user selects an appropriate broadcast channel for a CM the user wants to record and receives a broadcast on the channel. It should be noted that ordinary CMs are broadcasted from unspecified commercial broadcast stations but for a CM for a broadcast station itself or for a specific program, it is necessary to designate a specific broadcast channel because the CM is broadcasted from only that broadcast station. On this account, the CM information should be sent from the CM information server 103 along with its feature for an improved efficiency of the CM-recording programming. Further, in case a time zone in which a CM is to be broadcasted can be known, the CM information server 103 should send information on the time zone in order to attain such an improved efficiency of the CM-recording programming.

In next step S2402, the controller 702 detects a CM in a video on a receiving channel.

In step S2403, the controller 702 calculates a feature of the detected CM. In step S2404, the controller 702 compares the calculated feature with a feature of the CM whose recording has been programmed to judge whether these features are coincident with each other. When the result of judgment in step S2404 is affirmative (Yes), that is, if the features are coincident with each other, the controller 702 goes to step S2405. On the contrary, if the result of judgment is negative (No), that is, when the features are not coincident with each other, the controller 702 returns to step S2402.

If any CM coincident in feature with the CM whose recording has been programmed even after the controller 702 returns to step S2402 and repeats the above procedure, the user may select another broadcast channel or another time zone in step S2401.

Figure 25:
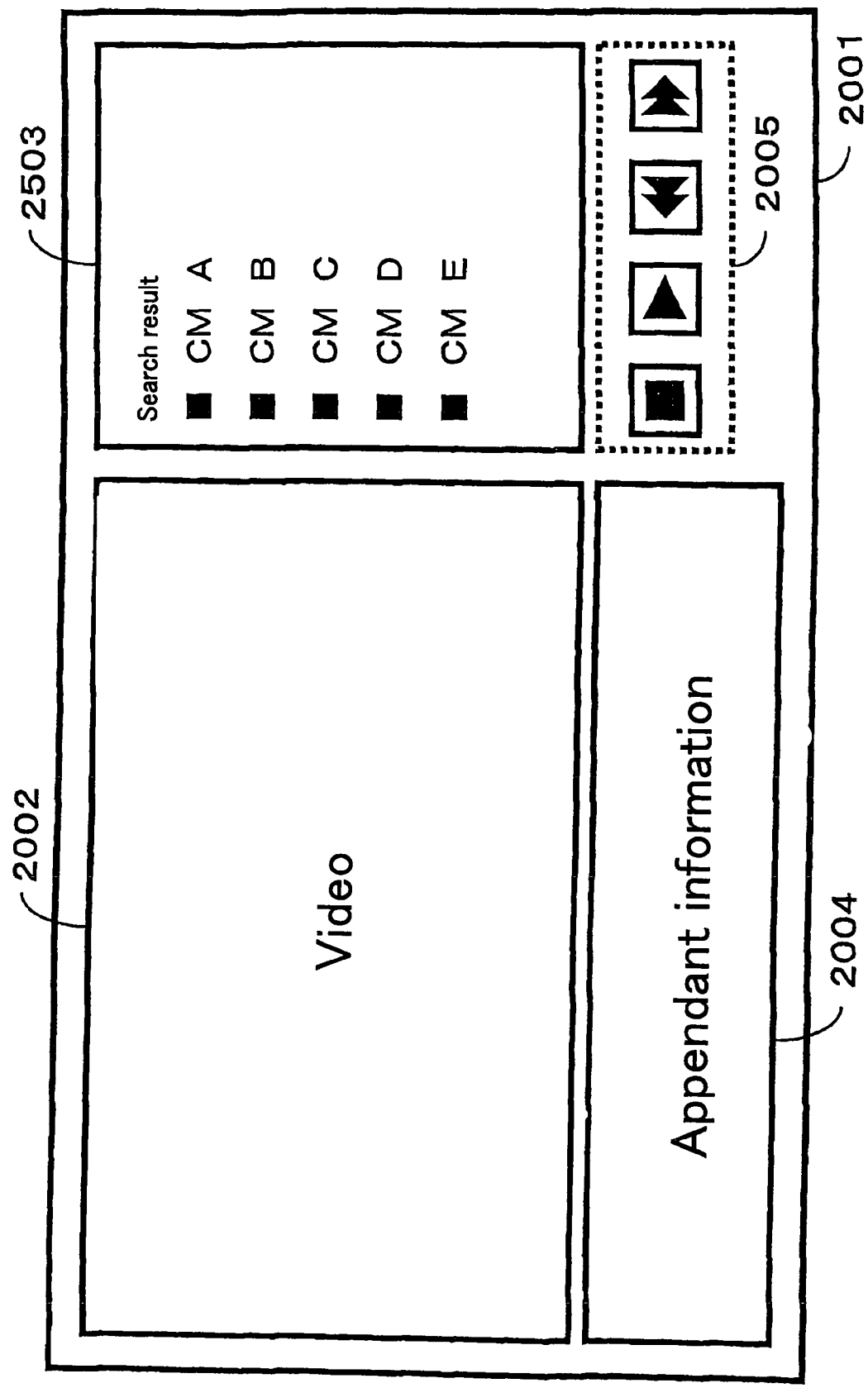
FIG. 25 shows yet another example of display screen at the recorder/player.

In step S2405, the recorder/player 700 records a CM coincident in feature with the CM whose recording has been programmed. Thus, it is possible to make programmed recording of a CM whose broadcast time zone and channel are not known. Upon recording of the CM whose recording has been programmed, the small square before the CM D, for example, in the result-of-search display area 2503 will also be blackened as shown in FIG. 25 and the user can view the CM.

Figure 9:
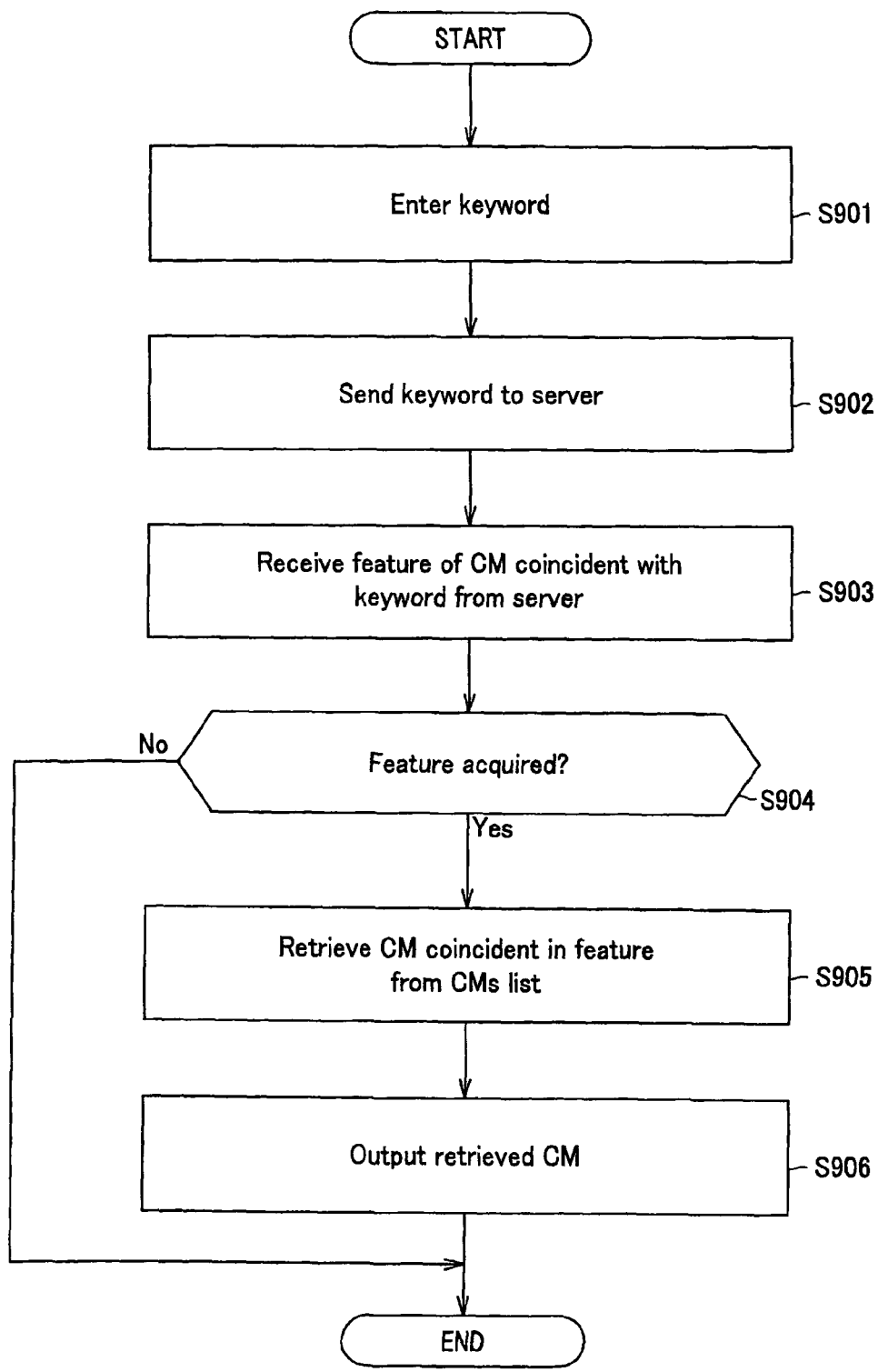
FIG. 9 also shows a flow of operations made in the recorder/player in making inquiry to the CM information server about CM-appendant information.
Figure 19:
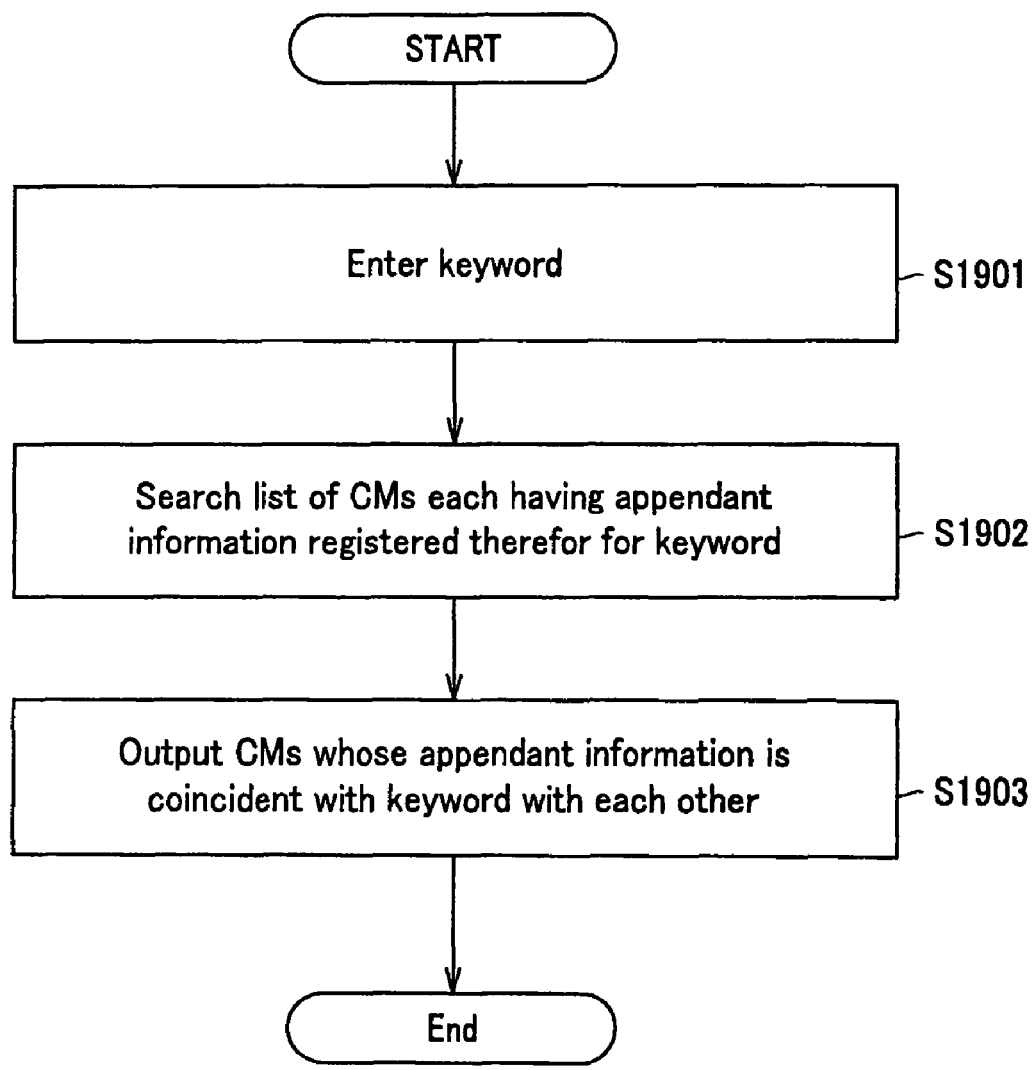
FIG. 19 shows a flow of operations made in a recorder/player of the user in making a search for a CM.

Although in the flow diagram in FIG. 9 showing the inquiry about a CM, the inquiry is made based on keyword entered by the user, it may be made by searching the data base in the recorder/player 700 of the user 102 as shown in FIG. 19.

When the CM inquiry has been made sometimes to the CM information server 103, information appendant to the inquired CM has been acquired and is registered in the list of CMs each having appendant information already registered therefor. Therefore, in case not all CMs meeting a condition are necessary or in an environment in which no network is accessible, it is also possible to search CMs in only the data base in the recorder/player 700 of the user 102. The procedure for this search will be as shown in FIG. 19. In this case, the user 102 enters a keyword first in step S1901.

In next step S1902, the controller 702 detects CMs in the list of CMs each having appendant information already registered therefor and whose appendant information is coincident with the keyword.

In next step S1903, the controller 702 outputs CMs coincident with the keyword and exits the procedure. Thereafter, the controller 702 has only to inquire the CM information server 103 about the CMs as necessary.

Figure 10:
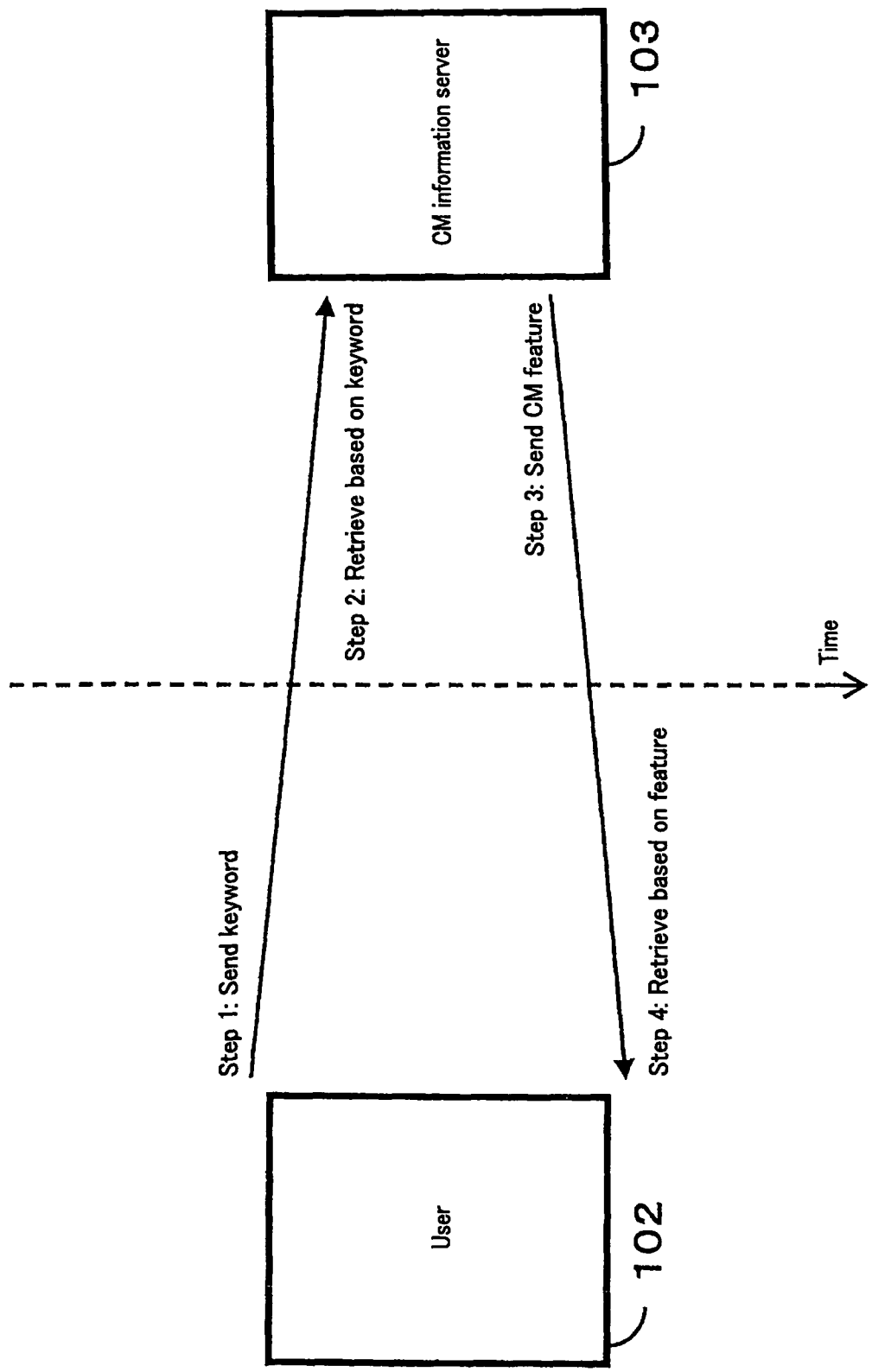
FIG. 10 schematically illustrates interaction between the recorder/player and CM information server.

Next, communication between the recorder/player 700 of the user 102 and the CM information server 103 will be explained with reference to FIG. 10.
Step 1:
To acquire a CM feature, a keyword for CM search is sent from the recorder/player 700 of the user 102 to the CM information server 103.
Step 2:
The CM information server 103 searches the data base in the CM information server 103 on the basis of the received keyword as a key.
Step 3:
When a CM coincident with the keyword is found as the result of search, the CM information server 103 sends a feature of the CM to the recorder/player 700 of the user 102. In case any CM coincident with the keyword, the user's recorder/player 700 is informed of that fact. If a CM coincident with the keyword, information to be sent from the CM information server 103 to the user 102 always includes a feature of the CM. The information may further include appendant information such as names of a company and article for the CM, actor or actress appearing in the CM, music used with the CM, etc.
Step 4:
In case the information received from the CM information server 103 includes the feature of the CM, the recorder/player 700 of the user 102 searches the data base for a CM whose feature is coincident with that feature and provides the user 102 with the result of search while registering appendant information including the keyword into the data base in the recorder/player 700 of the user 102. If no CM feature is included in the received information, the user is informed that no CM coincident with the keyword has been acquired.

Figure 26:
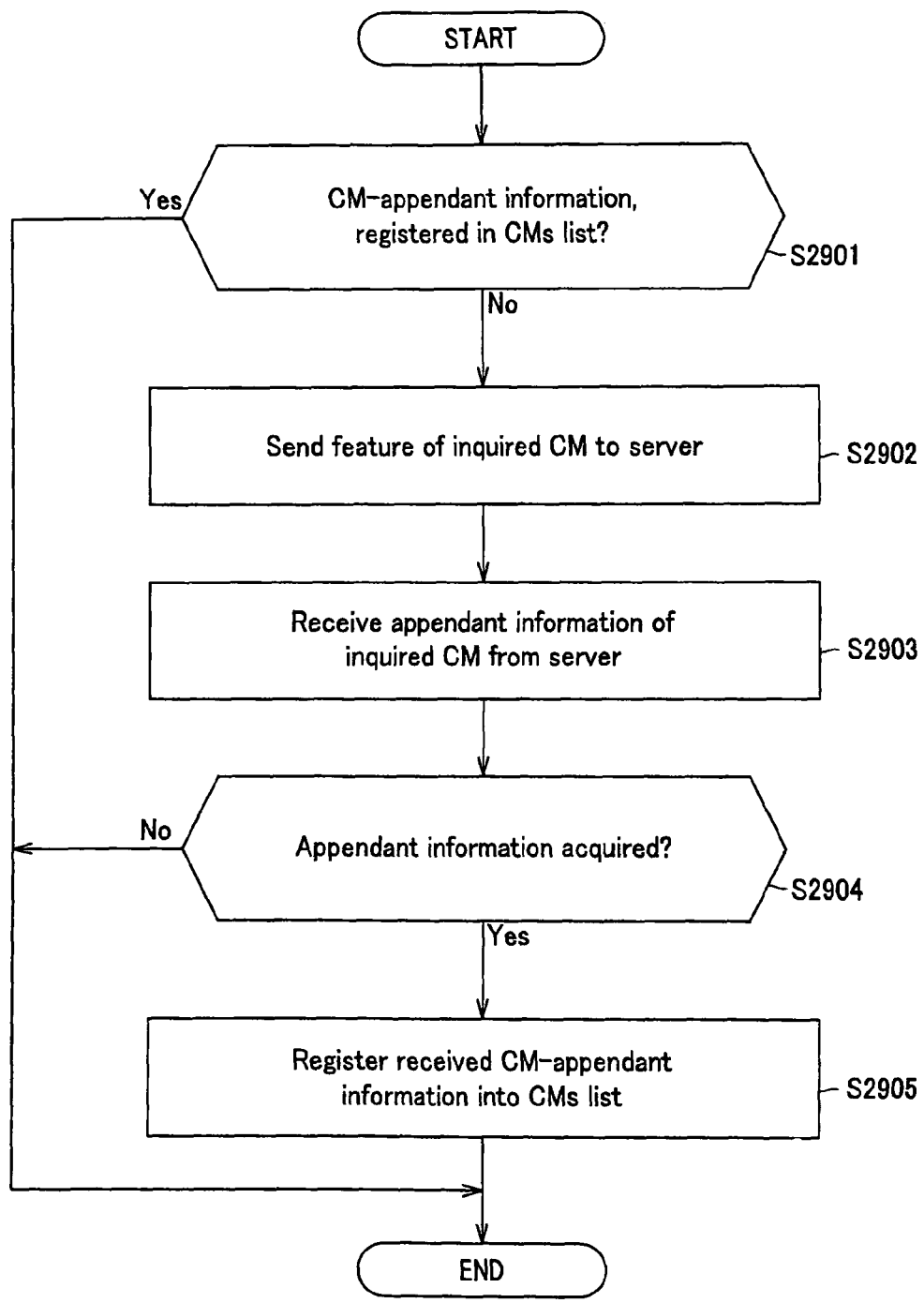
FIG. 26 shows a flow of operations made in the recorder/player in making inquiry to the CM information server about CM-appendant information.

Further, inquiry about CM-appendant information made by the recorder/player 700 of the user 102 to the CM information server 103 will be explained with reference to the flow diagram shown in FIG. 26. The inquiry is made when the user 102 has entered a command for acquisition of CM-appendant information from the CM information server 103 and/or when a new CM has been detected.

First in step S2901 in the inquiry about CM-appendant information, the controller 702 judges whether the same CM as a CM having appendant information the user wants to know has already been registered in the list of CMs each having appendant information registered therefor. In case the result of judgment in step S2901 is affirmative (Yes), namely, when the appendant information has already been registered, the controller 702 provides the user with the appendant information and exits the procedure. On the contrary, in case the result of judgment in step S2901 is negative (No), that is, if the appendant information has already been registered, the controller 702 will go to step S2902.

In step S2902, the controller 702 sends a feature of a CM having appendant information the user wants to acquire to the CM information server 103. The controller 702 sends the CM feature by acquiring a CM feature from the data base 704 and sending the feature to the CM information server 103 via the network controller 705, for example.

In next step S2903, the controller 702 receives appendant information from the CM information server 103. Namely, the controller 702 receives the appendant information from the CM information server 103 via the network controller 705.

In next step S2904, the controller 702 judges whether the information returned from the CM information server 103 includes appendant information of a CM about which the inquiry has been made. If the result of judgment in step S2904 is affirmative (Yes), that is, if the CM is included, the controller 702 goes to step S2905. On the contrary, if the result of judgment is negative (No), that is, if no such appendant information is included, the controller 702 informs the user of that fact and exits the procedure.

A CM having just been started being broadcasted has its appendant information not yet registered in the CM information server 103 as the case may be. In this case, the user cannot acquire any appendant information. The controller 702 informs the user that the appendant information has not yet been registered in the CM information server 103 by supplying the information to an external output unit such as monitor (not shown) via the output controller 706.

In step S2905, the controller 702 informs the user of the appendant information acquired from the CM information server 103, associates the appendant information with a corresponding CM in the list of CMs each having appendant information not yet registered therefor, and moves the CM to the list of CMs each having appendant information already registered therefor.

Figure 27:
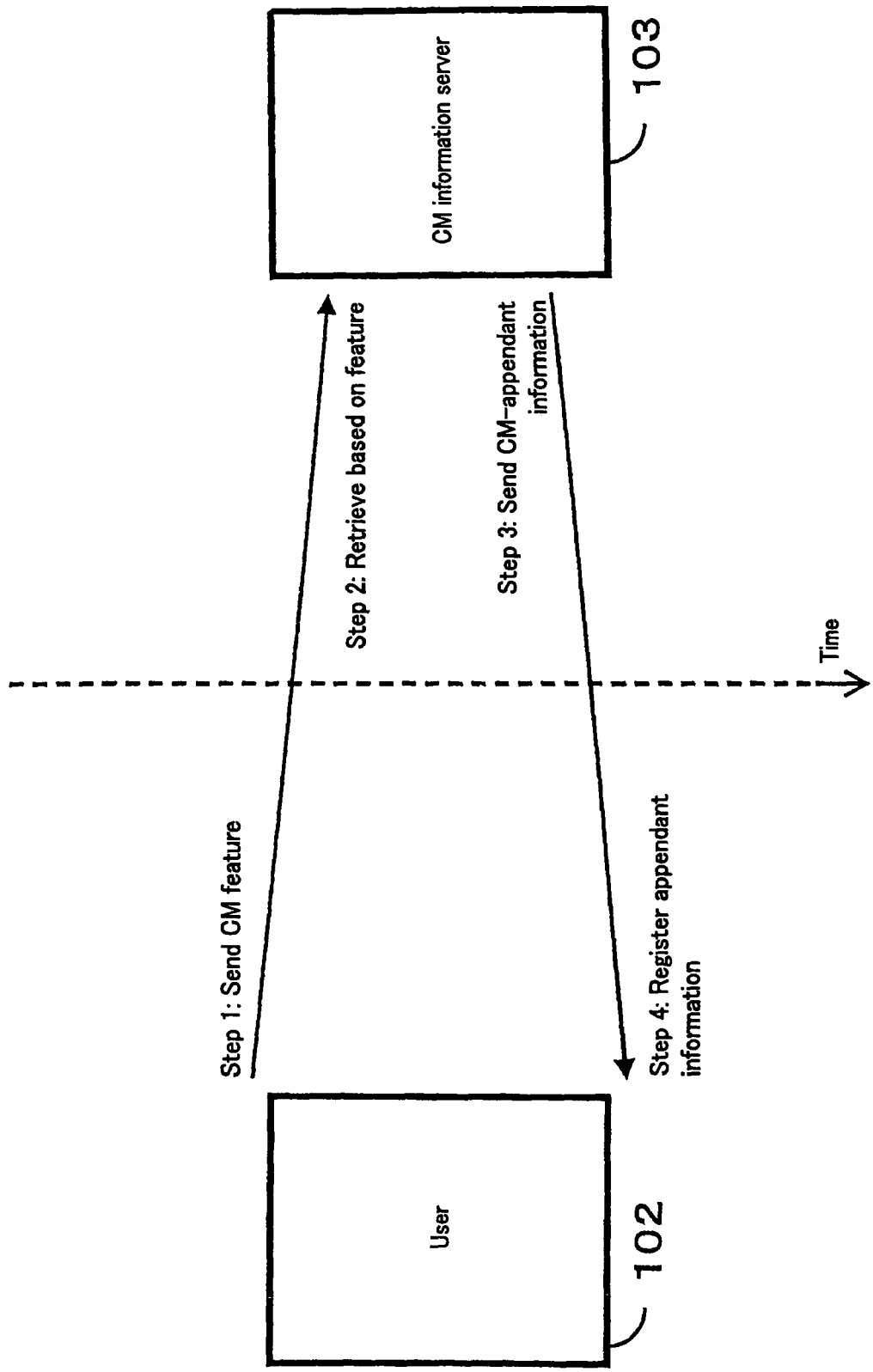
FIG. 27 schematically illustrates interaction between the recorder/player and CM information server.

Next, communication between the recorder/player 700 of the user 102 and the CM information server 103 will be explained with reference to FIG. 27.
Step 1:
To acquire appendant information of a CM in response to a user's command and/or automatically, the controller 702 sends a feature of the CM from the recorder/player 700 of the user 102 to the Cm information server 103.

Step 2:

The controller 702 searches the data base in the CM information server 103 on the basis of the received CM feature as a key.

Step 3:

When a CM coincident in feature with the received CM has been found as the result of search, the controller 702 sends appendant information of the CM from the CM information server 103 to the recorder/player 700 of the user 102. If no CM coincident in feature with the received CM, the controller 702 sends information that no appendant information has been found to the recorder/player 700 of the user 102.

Step 4:

In case the information received from the CM information server 103 includes appendant information of the inquired CM, the controller 702 provides the user with the appendant information while registering it into the data base in the user's recorder/player 700. If no appendant information of the inquired CM is included in the received information, the controller 702 will inform the user 102 of that fact.

Figure 11:
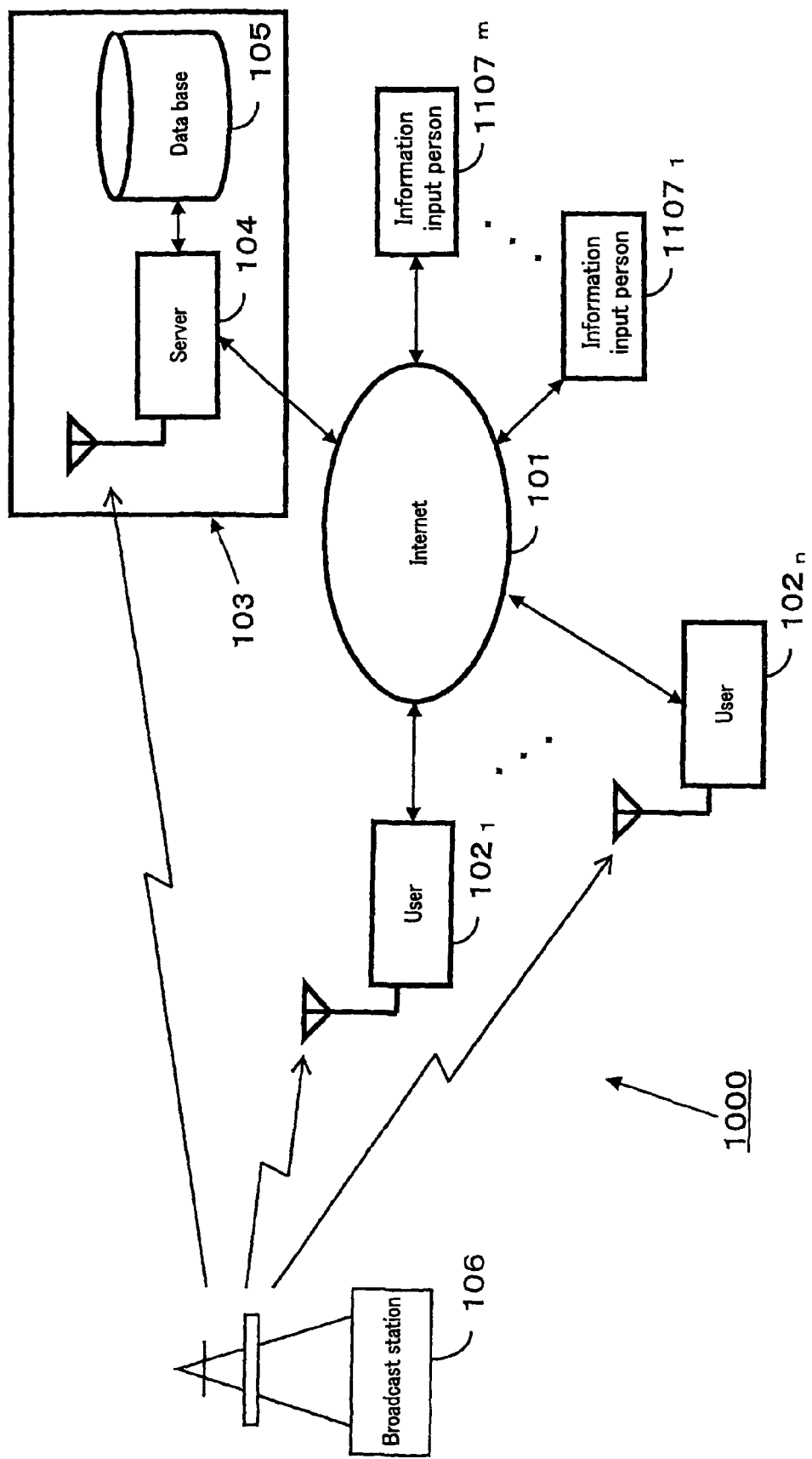
FIG. 11 is a conceptual diagram of another system connection according to the present invention.

In the aforementioned example, the data base to store CM-appendant information is also formed in the recorder/player 700 of the user 102 as well. However, the present invention is not limited to this system but the CM-appendant information supplying system may be adapted such that inquiry will be made to the CM information server 103 whenever search is required. Also in the aforementioned example, the server manager supplies CM information server 103 with appendant information collected by a method (not shown). However, the present invention is not limited to the latter system, but the CM-appendant information supplying system may be adapted such that a list of CMs will be publicized on the Web being displayed on a screen as shown in FIG. 13, for example, and a certain or uncertain person will enter appendant information for the CMs via the network by using a screen as shown in FIG. 14, for example. In this case, the connection in a CM-recording programming system, generally indicated with a reference numeral 1000, is as conceptually shown in FIG. 11. Namely, information input persons 11071, . . . , 1107m (will generically be referred to as "information input person 1107" hereunder) are added to the conceptual connection diagram shown in FIG. 1.

Here, handling of a list of CMs each having appendant information not yet registered therefor in the data base in the CM information server 103 in the CM-recording programming system 1000 will be explained with reference to the flow diagram shown in FIG. 12.

In step S1201, the controller 202 judges whether a new CM has been registered in the list of CMs each having appendant information not yet registered therefor in the data base. In case the result of judgment in step S1201 is affirmative (Yes), that is, when a new CM has been registered, the controller 202 goes to step S1202. On the contrary, if the result of judgment is negative (No), namely, if no new CM has been registered, the controller 202 exits the procedure.

In step S1202, CMs registered in the list of CMs each having appendant information not yet registered therefor are provided to the information input person on the network. The controller 202 presents the CMs by displaying the list of CMs each having appendant information not yet registered therefor in the data base 204 on an output unit such as monitor (not shown) of the information input person on the network via the network controller 205, for example. The output unit of the information input person displays a screen showing, in the form of a list, CMs in the list of CMs each having appendant information not yet registered therefor as shown in FIG. 13, for example.

In step S1203, the information input person having confirmed the list of CMs each having appendant information not yet registered therefor operates an input unit such as keyboard to enter appendant information collected by a method (not shown). The controller 202 associates the appendant information entered from the input unit such as keyboard (not shown) of the information input person on the network via the network controller 205 with a corresponding CM in the list of CMs each having appendant information not yet registered therefor in the data base 204, for example. At this time, a screen showing appendant information items and their respective input lines 1402 to 1405 arranged as shown in FIG. 14, for example, is displayed on the output unit such as monitor of the information input person on the network to support the entry of appendant information.

In step S1204, a CM for which appendant information has been entered is moved from the list of CMs each having appendant information not yet registered therefor to the list of CMS each having appendant information already registered therefor, and the procedure is ended.

Figure 12:
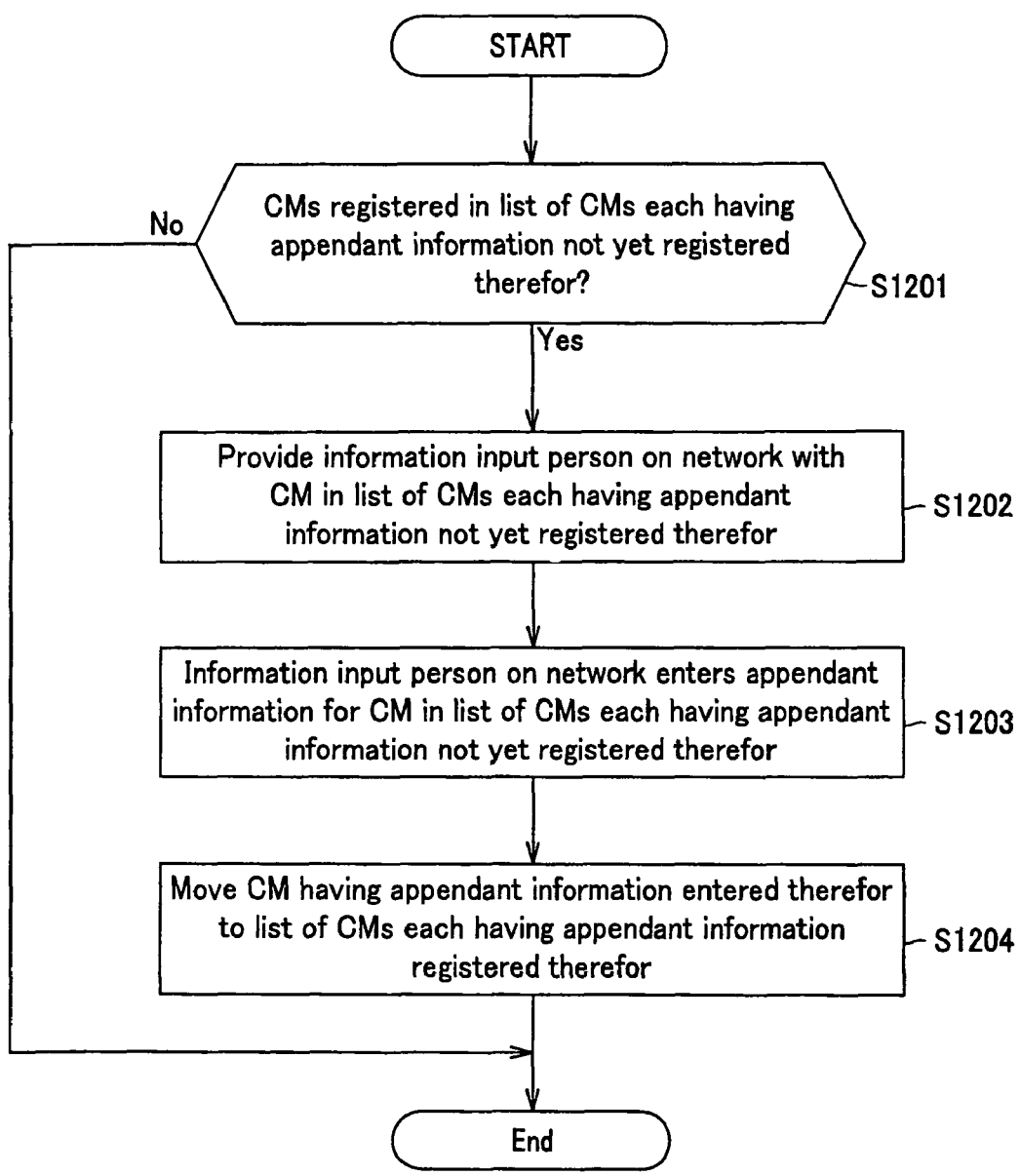
FIG. 12 shows a flow of operations made in the CM information server in the CM-recording programming system in handling the list of CMs having appendant information not yet registered therefor in a data base.

Note that the series of operations shown in FIG. 12 may be set to start each time a new CM is registered in the data base, at a predetermine time interval, for example, at every hour, or when the information input person gives a command for starting the procedure.

Note that although the embodiment of the present invention has been described concerning the CM search based on a CM feature as in the Patent Document 3, the present invention is not limited to this method but an image, for example, may be acquired on the basis of a quantity determined by a method as shown in FIG. 16 as a feature.

Figure 16B:
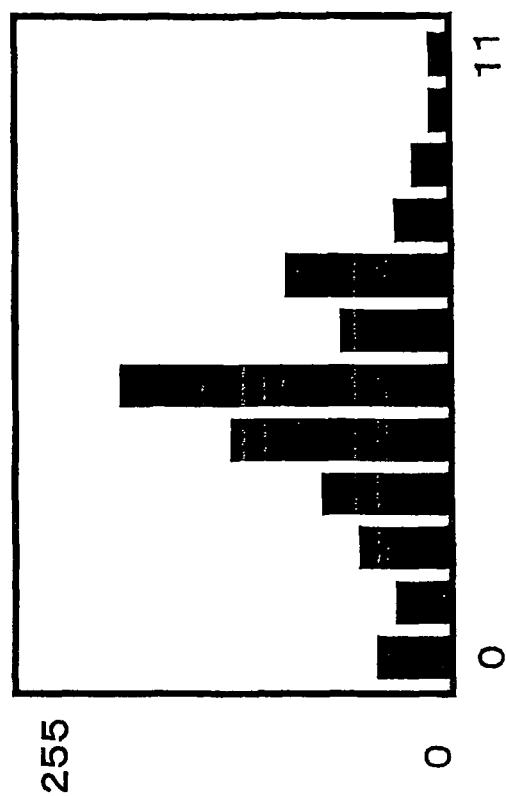
FIG. 16 shows examples of image features.
Figure 16A:
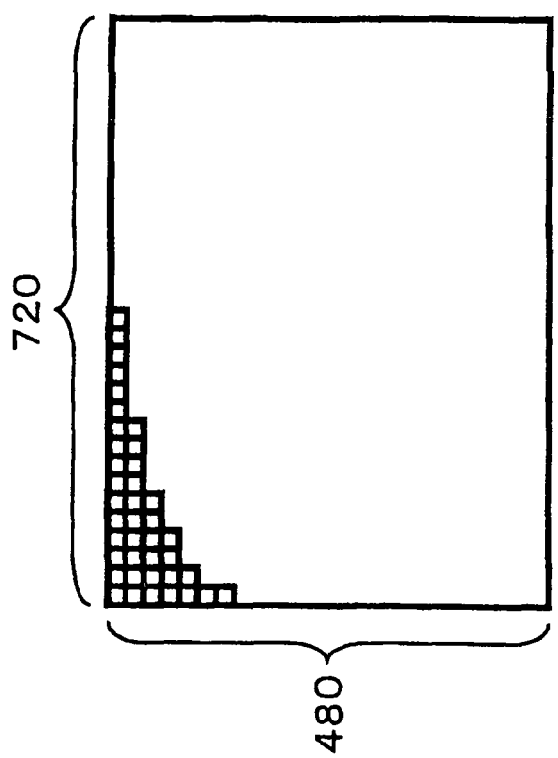

FIG. 16 shows examples of image features. In the case of NTSC method, a video of 1 sec consists of about 30 images. As shown in FIG. 16A, one image is a matrix of 720 horizontal pixels and 480 vertical pixels, and one pixel is formed from three RGB values. In case each RGB is represented by 1 byte, one image has a data amount of about 1 MB (720×480× 3=1036800). For example, a 15-sec CM includes about 450 images, and thus it has a data amount of about 450 MB. Even if the 15-sec CM is compressed at a low rate, for example, at 2 Mbps, for example, with the MPEG-2, it will have a data amount of about 4 MB. On the other hand, when a histogram of image brightness is used as shown in FIG. 16B, one image can be represented by 11 bytes. In this example, a histogram is formed by dividing the brightness by 16 on the assumption that the brightness of each pixel is in a value range of 0 to 255, and each value is normalized for representation by 1 byte. Further, since the frequencies of appearance of black (near "0") and white (near "255") are not high, 5 bands near the black and white are ignored. In this case, the time of 15 sec corresponds to about 5 kB. Although no original CM can be estimated from the feature shown in FIG. 16B, the same feature can be determined from the same CM and different features will be determined from different CMs with a high probability.

Figure 17:
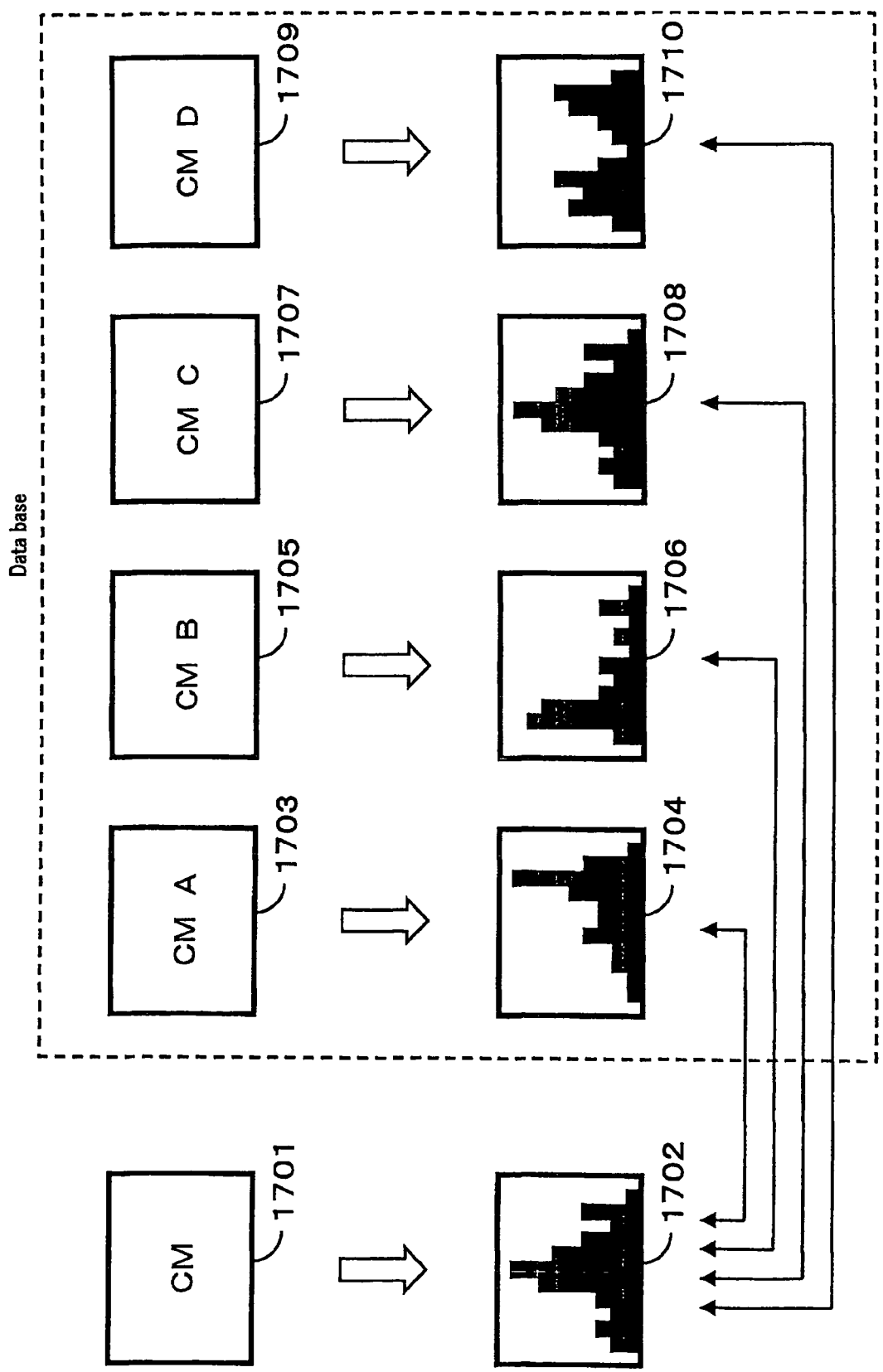
FIG. 17 shows an example of feature-based search.

Whether a television-broadcasted CM is a new CM can be judged depending upon whether the CM is already registered in the data base 105. More specifically, the data base 105 is detected on the basis of the broadcast CM as a key. When the same CM is found in the data base 105, the CM taken as a key can be determined not to be any new CM. If the same CM is not found, the CM taken as the key can be determined to be a new CM. In this CM search, there is used a feature of the CM as sent to the user 102, not the CM video itself. For example, in case CM 1701 is judged to be a CM already registered in the data base or not, CM 1703, CM 1705, 1707 and 1709 in the data base are compared in video data, not in feature, with CM 1701 as shown in FIG. 17. That is, a feature 1702 is determined from the video data of CM 1701. Similarly, features 1704, 1706, 1708 and 1710 are also determined of CMs in the data base. The features 1704, 1706, 1708 and 1710 in the data base are compared with the feature 1702 of CM 1701. In the example shown in FIG. 17, since the features 1702 and 1708 are coincident with each other, it can be determined that CM 1701 and 1707 are the same as each other and CM 1701 has already been registered in the data base. The method of making a search for a CM on the basis of a feature of the CM, not of any feature of the CM, can be carried out with a considerably small amount of data and thus permits a rapid search. The technique for making a search for a feature coincident with a key feature from the data base 105 at a high speed is disclosed in detail in the Patent Document 3.

It should be understood by those skilled in the art that various modifications, combinations, sub-combinations and alterations may occur depending on design requirements and other factors insofar as they are within the scope the appended claims or the equivalents thereof.

What is claimed is:

1. A CM searching method in which:
    having detected a commercial message from a television broadcast, calculated a feature of the detected commercial message, accepted input of information appendant to the commercial message, and created a data base in which the calculated commercial-message feature and the commercial message-appendant information are associated with each other, a CM searching apparatus searches, in response to a request for a commercial-message search in which a keyword sent from a CM search-result receiving apparatus via a network is taken as a key, the data base for a commercial-message feature and commercial message appendant information on the basis of the keyword as a key, and sends the commercial-message feature and the commercial message appendant information detected in the data base to the CM search-result receiving apparatus via the network, the commercial message appendant information including at least one of names of a company and article, for which the CM is broadcast, music used with the CM, and an actor or actress appearing in the CM, the commercial message appendant information being information entered by a server manager according to a display screen; and
    the CM search-result receiving apparatus sends a request for a search in which the keyword for a search for the commercial message is taken as a key to the CM searching apparatus via the network and receives the commercial-message feature and the commercial message appendant information detected by the CM searching apparatus from the data base via the network, detects broadcast CMs in a television broadcast, calculates a feature of the detected broadcast commercial messages, and selects broadcast commercial messages whose calculated feature is coincident with the commercial-message feature received from the CM searching apparatus via the network,
    when a commercial message from a television broadcast is detected the commercial message is included in either a list of CMs each having appendant information not yet registered therefor or a list of CMs each having appendant information already registered therefor, and when the server manager selects a specific CM from the CMs in the list of CMs each having appendant information already registered therefore a screen is displayed which includes an area where the CM-appendant information for the specific CM is displayed and an area where the video of the specific CM is displayed,
    the CM search result receiving apparatus shows a screen to inform a user of the search result, the screen including simultaneous display of an area in which a list of a plurality of CMs corresponding to the keyword is displayed, an area in which the video of the CMs is displayed, an area in which appended information of the CMs is displayed, and a control area provided to select a to-be-reproduced CM from the list of CMs corresponding to the keyword,
    the area in which a list of a plurality of CMs corresponding to the keyword is displayed including, for each listed CM, an indication of whether or not a video of the CM exists in the CM search result receiving apparatus,
    wherein the commercial-message feature for the commercial message is computed by computing a histogram of image brightness for each image included in the commercial message, each histogram representing number-of-pixels as a function of brightness-band and representing each value of number-of-pixels with one byte of data, and each histogram excluding brightness-bands corresponding to extremely low brightness and brightness-bands corresponding to extremely high brightness.

2. The method according to claim 1, wherein the CM searching apparatus makes a request to a specific or unspecific person connected to the network for entering CM-appendant information.

\* \* \* \* \*